US005365569A

United States Patent [19]
Witsaman et al.

[11] Patent Number: 5,365,569
[45] Date of Patent: Nov. 15, 1994

[54] DIGITAL SIMULCAST TRANSMISSION SYSTEM

[75] Inventors: Mark L. Witsaman; Roger E. Benz; David W. Glessner; Joel R. Crowley-Dierks, all of Quincy, Ill.

[73] Assignee: Glenayre Electronics, Ltd., Vancouver, Canada

[21] Appl. No.: 931,789

[22] Filed: Aug. 17, 1992

[51] Int. Cl.$^5$ .................. H04M 11/00; H04B 1/00
[52] U.S. Cl. ........................ 379/57; 455/51.2
[58] Field of Search .............. 455/16, 51.2, 56.1, 455/72, 12.1, 13.2, 13.1; 379/56, 57, 1, 9, 27, 111, 279; 340/825.44; 375/107, 38, 100; 370/95.1, 95.3, 94.1, 94.2, 84

[56] References Cited

U.S. PATENT DOCUMENTS

| | | | |
|---|---|---|---|
| 4,709,402 | 11/1987 | Akerberg | 455/51.2 |
| 4,849,993 | 7/1989 | Johnson et al. | 375/108 |
| 4,850,032 | 7/1989 | Freeburg | 455/51.2 |
| 4,968,966 | 11/1990 | Jasinski et al. | 340/825.44 |
| 5,023,900 | 6/1991 | Tayloe et al. | 379/59 |
| 5,060,240 | 10/1991 | Erickson et al. | 455/51.2 |
| 5,077,759 | 12/1991 | Nakahara | 345/107 |
| 5,090,025 | 2/1992 | Marshall et al. | 375/4 |
| 5,153,874 | 10/1992 | Kohno | 375/38 |
| 5,162,790 | 11/1992 | Jasinski | 455/16 |
| 5,220,676 | 6/1993 | LoGalbo et al. | 455/13.2 |
| 5,257,404 | 10/1993 | Goreham et al. | 455/51.2 |

FOREIGN PATENT DOCUMENTS

| | | | |
|---|---|---|---|
| 0228237 | 9/1989 | Japan | 375/107 |
| 0470027 | 3/1992 | Japan | 375/107 |

Primary Examiner—Curtis Kuntz
Assistant Examiner—Michael B. Chernoff
Attorney, Agent, or Firm—Christensen, O'Connor, Johnson & Kindness

[57] ABSTRACT

A simulcast system for broadcasting the same signal for a number of spaced-apart broadcast sites is disclosed. The system (20) of this invention includes a hub (28) adapted to receive the signal to be simulcast and a number of stations (30) that actually broadcast the signal. The hub places the digital signal packets referred to as PDBs (36). As part of the signal packetization process, the hub evaluates the rate at which the signals should be broadcast and assigns a start time at which the signals should be broadcast; this information is attached to the PDBs. After a PDB is created it is forwarded to the stations over a link channel. Each station includes a station controller (32) and a station transmitter (34). The station controller, upon receiving a PDB, forwards the signal therein to the transmitter at the start time indicated and at the appropriate broadcast rate. All of the stations transmitting the signals contained within a single PDB do so based on the start time and broadcast rate information contained in that PDB. Consequently, each station broadcasts the same signals at the same time and at the same rate so as to ensure their simultaneous transmission.

47 Claims, 21 Drawing Sheets

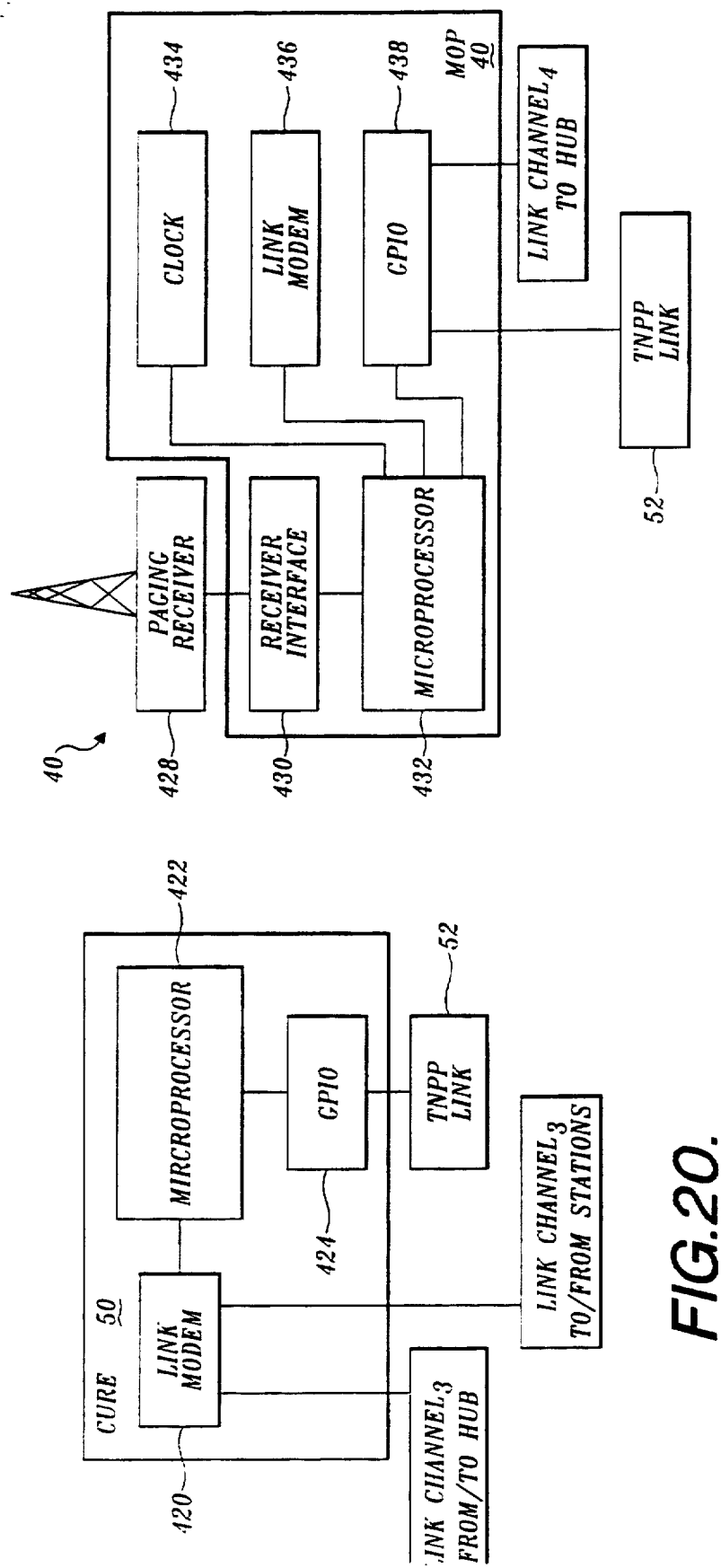

DIGITAL SIMULCAST TRANSMISSION SYSTEM

FIELD OF THE INVENTION

This invention relates generally to simulcast transmission systems and, more particularly, to a simulcast transmission system for broadcasting signals that are forwarded to transmitting sites over one or more digital signal communication networks.

BACKGROUND OF THE INVENTION

Simulcasting is the practice of broadcasting a single radio-frequency signal from multiple locations at the same time. Simulcast transmission networks are established when it is desirable to maximize the area over which receivers tuned to the network's broadcast frequency are able to pick up and process the broadcast signal. A paging system is one type of radio system that is operated as a simulcast system. In a paging system, system subscribers are provided with small radio receivers, called pagers. The paging system further includes one or more paging terminals and a number of transmitter sites. The paging terminals are connected to the publicly switched telephone network and receive calls for the individual system subscribers. In response to receiving an incoming call, a paging terminal will generate a message, a page. The page is forwarded to the transmitter sites, which broadcast the page for receipt by the subscriber's pager. When a page is received by a pager for the subscriber to whom the pager is assigned, an annunciator or display integral with the pager is actuated to inform the subscriber of the call. Paging systems are provided with multiple, spaced-apart transmitter sites to maximize the coverage area in which a pager can function.

The individual transmitter sites of a paging system and of other simulcast networks must operate in concert so as to transmit the same signal at the exact same instant. This is important because pagers or other receivers in areas where signals from two or more transmitting sites can be received will receive signals from each transmitter site. If the signals are out of phase, their sum produces a single signal that frequently cannot be processed by the receiver. Thus, paging systems and like broadcast systems are typically constructed so that each transmitter site broadcasts the same signal simultaneously. This ensures that in overlap areas the signals from multiple transmitter sites will be in phase and combine to produce a single signal that can readily be processed by the intended receiver.

Many simulcast systems have some type of analog signal link network between the central station, from which the signal to be broadcast originates, and the individual transmitter sites from which the signal is finally broadcast. A link network may take the form of a telephone or fiber-optic signal link between the central station and one or more particular transmitter sites. A link may alternatively take the form of a radio link between the central station and the transmitter site over a carrier frequency different from that over which the transmitter sites actually broadcast the simulcast signals. The links to some transmitter sites may actually be a multi-link connection. For example, it is not uncommon for a central station to first forward the signal to be simulcast to a satellite transmitter. The signal is sent up to a satellite, which retransmits it to one or more transmitter sites. In some of these systems each transmitter site includes a delay circuit that regulates when the received signals are to be rebroadcast. Collectively, the individual delay circuits are set to ensure that the transmitter sites associated therewith all broadcast the same signal at the same time.

While analog systems have proved useful for simulcast applications, they are not without disadvantages. Some analog simulcast systems require significant amounts of air time to constantly send new delay rate instructions to the individual transmitter sites to ensure that they all transmit the same signal. This "overhead" air time may significantly depreciate the amount of air time that is available to forward signals containing useful data, such as paging signals, to the transmitter sites for rebroadcast. Furthermore, the actual transmission delay time for any transmit station is a function of the link propagation time, the time it takes the signals to travel from the central station to the transmit station. If this link should change, as may happen because of an intermediate component failure, or due to a change in the day-to-day economics of running particular links, then the link propagation time will change. For example, the satellite receiver at one transmitter station may be taken out of service for maintenance; in order to maintain the transmission of simulcast data to the site, a link over the publicly switched telephone network may be temporarily established. Until a new link propagation time is forwarded to a transmitter site, that site will broadcast the page at a time out of phase with those broadcast by the surrounding sites. Still another disadvantage of many simulcast transmission systems is that they require maintenance receivers to continually monitor the delay between the time a signal is first forwarded by a central unit and the time it is finally broadcast by a transmitter site; this information is then used by the system's control circuitry to regularly adjust the transmission delay times for the individual transmitting sites.

A further limitation associated with analog linking networks is that in each step of the central station-to-transmitter site signal transfer, there is degradation of the signal. This happens as a result of the normal signal loss that occurs when an analog signal is processed by an amplifier and that occurs as a consequence of the broadcast and transmission of a radio signal. Usually, the longer the link between the central station and the transmitter site and/or the more times the signal is subjected to intermediate processing, the greater the degradation from the original signal. As a consequence of this degradation, the final signal that is received by the transmitter site for simultaneous broadcast may be so changed that the actual broadcast signal is unintelligible by the receivers for which it was intended.

SUMMARY OF THE INVENTION

This invention relates generally to a new simulcast system for linking remote transmitter sites to a central site and for ensuring that the transmitter sites all broadcast the same signal at the same time. More particularly, this invention is related to a simulcast transmission system that transmits data in digital format to the system transmitter sites and wherein integral with the data are instructions that direct all the transmitter sites to broadcast the data at a specific time and in a specific format.

The simulcast transmission system of this invention includes a central unit, called a hub, that in a paging system environment is configured to accept the pages formed by one or more paging terminals. There are also a number of transmitter sites, called stations, that accept pages from the hub and rebroadcast them for general reception by the pagers. The hub receives, or captures, paging signals generated by the paging terminals. Based on ancillary information generated with the paging signals, and on the characteristics of the paging signals themselves, the hub determines the particular format of the paging signals that are generated by the paging terminal. Specifically, the hub determines if the signals are in analog or digital format. If the signals are in digital format, the hub determines the time period of each signal, which is referred to as its bit duration. Regardless of the form of the pages upon leaving the paging terminal, the hub repackages the pages into a digital signal form wherein all of the signals have the same bit duration. The signals are placed in a packet called a paging data block (PDB). At the head of each PDB, the hub places a block of control instructions indicating the start time at which the signals therein should be broadcast and data from which the rate of broadcast of the signals can be determined. The PDBs are then sent to the individual stations over one or more link channels, which serve as the hub-to-station signal pathways. The PDBs are sent over the link channels to the stations at a rate faster than the rate at which the signals therein are broadcast.

The stations each include a station controller that is adapted to receive the PDBs over the link channels and a transmitter for broadcasting the signals contained in the PDBs. When a station receives a PDB, the station controller strips away the control information and forwards the paging signals to the transmitter. Based on the control information, the station controller then regulates the mode in which the signals are broadcast, when the transmitter broadcasts the paging signals, and the rate at which they are broadcast.

In the simulcast system of this invention, each station controller receives the same PDB. Each station controls the broadcast of data from the associated transmitter based on a common start time and baud rate information. Consequently, all the stations will broadcast the same information at the same time. This ensures that receivers, the pagers, in areas where signals from multiple stations are picked up, will not receive overlapping signals that produce an unintelligible composite signal.

There are a number of advantages to the simulcast system of this invention. The start time for each PDB is established by the hub and need be for only a time later than the time the last station will receive PDBs. Other than this requirement, the start time is independent of the time it takes the PDBs to propagate to the stations over the link channels. Consequently, a change in hub-to-station PDB propagation time for any single station will not affect that station's ability to broadcast information simultaneously with the other stations. Moreover, the PDBs are sent to the stations over the link channels at a rate faster than the rate at which the pages therein are to be broadcast. This makes it possible to use the link channels as a medium for other communication, such as the sending of commands and configuration information to the stations, without infringing on the time needed to forward the pages to the stations for broadcast.

The system of this invention also operates independently of the characteristics of the signals it is used to broadcast. For example, whenever the data rate of the signals to be broadcast changes, or the nature changes from digital to analog format, the system automatically sends the signals in a PDB with appropriate transmission control information. On receipt by the station controllers, the data are automatically simulcast at the appropriate time, and in the appropriate format based on that control information. Thus, this system is well suited to simulcast signals from paging terminals and like units that generate signals having widely varying characteristics, such as changing baud rates, and/or that may change from analog to digital format.

This simulcast system further allows PDBs to be forwarded to the individual stations over two or more link channels. Processing equipment at the individual station controllers can then selectively transmit the data from the first error-free PDB received, or from the packet that has the fewest errors. Link spreading can be employed to forward PDBs from the hub to a particular station so that the station will receive some PDBs over a first link channel and the remainder of its PDBs over one or more additional link channels. Link spreading is useful if, for example, economics or other factors make it difficult to send all the PDBs to a particular station over a single link channel. Still another advantage of this feature of the invention is that it allows the system to be configured so that there is always one or more secondary link channels over which PDBs can be forwarded to the individual stations in the event that the primary link channels fail. Should such failure occur, the station controllers will receive PDBs over the secondary link channel to ensure the uninterrupted broadcast of pages.

Another feature of this invention is that it does not require the use of maintenance receivers to constantly monitor the signals broadcast by the various stations to ensure that the signals are broadcast in synchronization. Also, commands to the stations can be interleaved with the transmission of PDBs to the stations to keep the loss of link transmission time to a minimum.

Furthermore, error correction material is added to the PDBs prior to their transmission over the link channels. The station controllers use this error correction material to correct errors that develop in PDBs during the transmission to the stations. This ensures that the control information acted upon by the station controller and the paging signals that are broadcast by the transmitter are as similar as possible to the information and paging signals that were first generated by the hub.

Still another feature of this invention is that signals other than signals for rebroadcast, the PDBs, can be broadcast over the link channels. The link channels can be used as the communications medium for broadcasting software instructions for downloading to the station controllers. This reduces the frequency with which personnel have to make site visits to the stations to perform hands-on maintenance or system-updating tasks. Also, some link channels may be configured as duplex links over which signals can be transmitted by the stations back to the hub. This allows the link channels to be used not only as paths over which PDBs and station instructions are transmitted, but also as the medium through which the stations transmit information back to the hub regarding their operational status. This feature of the system serves to minimize the need to set up ancillary station-to-hub links to reduce the overall costs associated with operating a simulcast system.

BRIEF DESCRIPTION OF THE DRAWINGS

The invention is pointed out with particularity in the appended claims. The above and further advantages of the invention may be better understood by referring to the following description, taken in conjunction with the accompanying drawings, in which:

FIG. 20 depicts in block diagram form primary components of a converter uplink repeater;

FIG. 21 depicts the primary components of a maintenance operating point;

GLOSSARY

The following are definitions of frequently appearing terms and acronyms that appear in the Detailed Description. Terms that have a subscript suffix "$_x$" are those wherein the system of this invention has multiple numbers of those units, which are distinguished from each other in the Detailed Description.

CURE Converter Uplink Repeater. A unit in a hub-to-station link channel that serves as the interface between segments of the channel.

GPIO General Purpose Input-Output board. An interface device connected between the hub, a station, a CURE or MOP, and the TNPP link.

HDLC bus/frame High-level Data Link Control bus. The intra-hub bus over which signals are exchanged between the hub central processor and the PTIs and the LMs. Signals are transferred over the HDLC bus in packets known as HDLC frames.

Hub The central unit of the system that receives paging signals from a paging terminal and that forwards the paging signals to the stations for broadcast by the stations.

Link frame The packet in which station packets are sent over a link channel from the hub to the stations.

LAG Local Area Group. A subset of stations in a wide area group.

Link channel$_x$ A communications network over which PDBs are transmitted from the hub to one or more stations.

LM$_x$ Link Modem. The interface unit between the hub and a link channel over which PDBs are forward to the link channel. Each link modem serves as the interface to two separate link channels.

MOP Maintenance Operating Point. A receiver positioned to monitor the signals broadcast by one or more stations and that provides status reports on the operating state of the associated stations back to the hub on the basis of those signals.

Paging terminal A unit that generates paging signals for simulcast by the system of this invention.

PTI$_x$ Paging Terminal Interface. The interface unit of the hub that receives paging signals from the paging terminal and converts them into PDBs.

PDB Paging Data Block. The basic signal packet in which paging signals and the control information for regulating the broadcast of same are broadcast from the hub to the stations.

Station A transmitter site distal from the hub from which signals are broadcast. Signals are broadcast from a number of stations simultaneously.

Station packet A packet of data that is sent to the stations from the hub central processing unit through a link modem and a link channel. A station packet may contain a paging data block or material, such as operating instructions, that the station should act upon.

TNPP link Telocator Network Paging Protocol link. A communications network, separate from the link channels, over which the system state information is exchanged between the hub and the other elements of the system, the stations, the MOPs, and the CUREs.

WAG Wide Area Group. A large set of stations through which pages are broadcast.

DETAILED DESCRIPTION OF THE PREFERRED EMBODIMENT

I. System Overview

Figure 1:
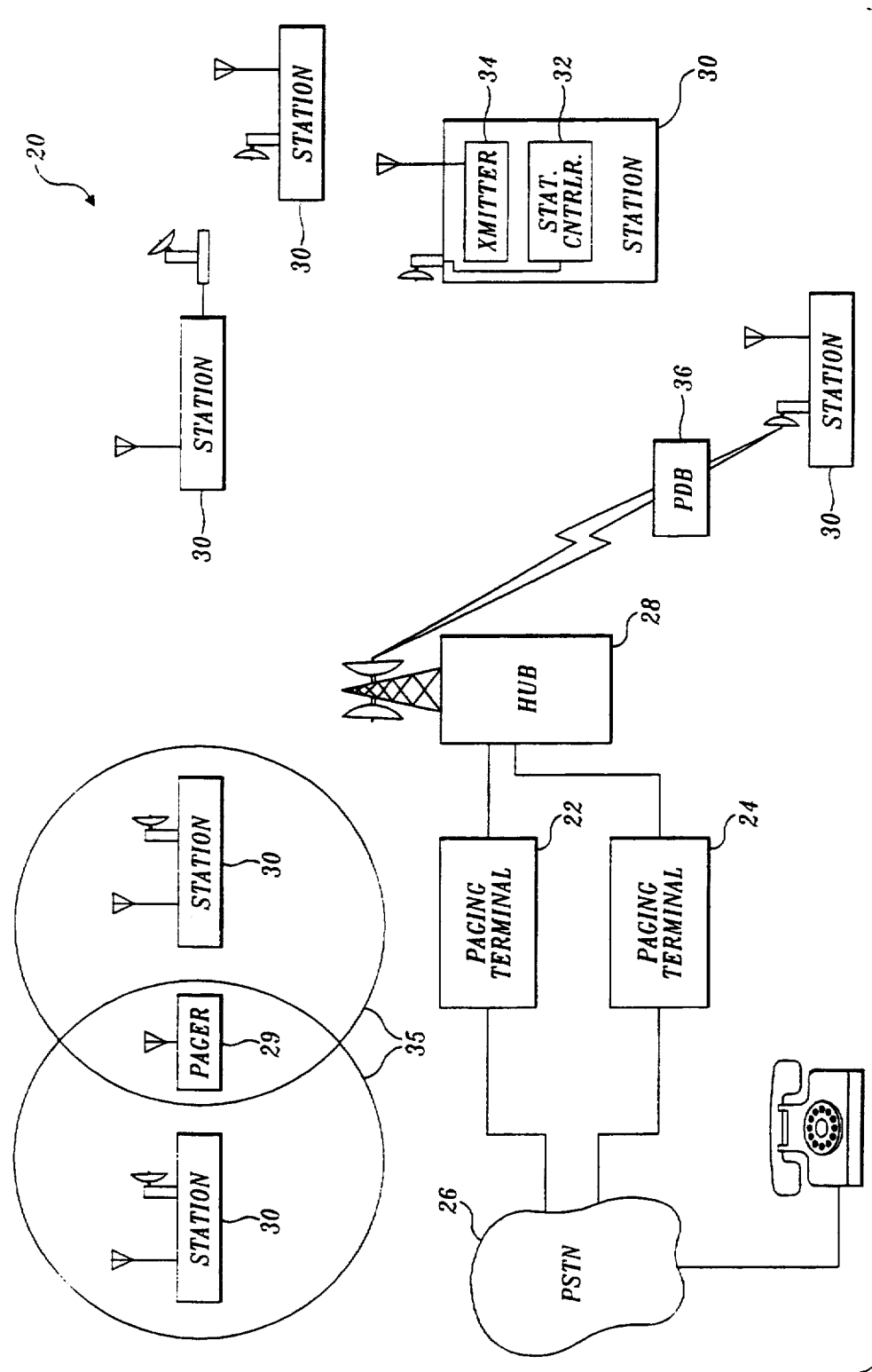
FIG. 1 is a block diagram of the basic elements of the paging system of this invention.

FIG. 1 illustrates a simulcast broadcast system 20 of this invention. The system 20 broadcasts pages that are generated by a set of paging terminals 22 and 24 connected to a publicly switched telephone network (PSTN)26. The system 20 includes a hub 28 that receives the pages from the paging terminals 22 and 24 and a set of stations 30 that broadcast the pages throughout the area in which the system operates. The pages broadcast by the stations 30 are monitored by receivers, known as pagers 29, assigned to individual system subscribers. The hub 28 receives the pages from the paging terminals 22 and 24 in the form of paging signals and bundles the paging signals into packets referred to as paging data blocks (PDBs) 36. Integral with each PDB 36 is control information that indicates the start time at which the pages therein should be broadcast and the rate at which they should be broadcast. The hub 28 forwards the PDBs 36 to the stations 30 over any convenient communications link. Each station 30 includes a station controller 32, that processes the information contained in the PDBs 36, and a transmitter 34 capable of broadcasting the pages over a frequency on which they can be monitored by the pagers 29. The various copies of a PDB 36 sent to a number of stations 30 all contain the same start time and baud rate information. Accordingly, the station controllers 32 integral with those stations/forward the pages contained in the PDB 36 to their associated transmitters 34 at the same time and at the same speed. Thus, the individual stations 30 will all broadcast the same paging signal at the same time. Consequently, pagers 29 located in areas where paging signals from two or more stations 30 can be received, as represented by overlapping circles 35, will receive signals that are in phase and that can be processed as a single, coherent signal.

Figure 2:
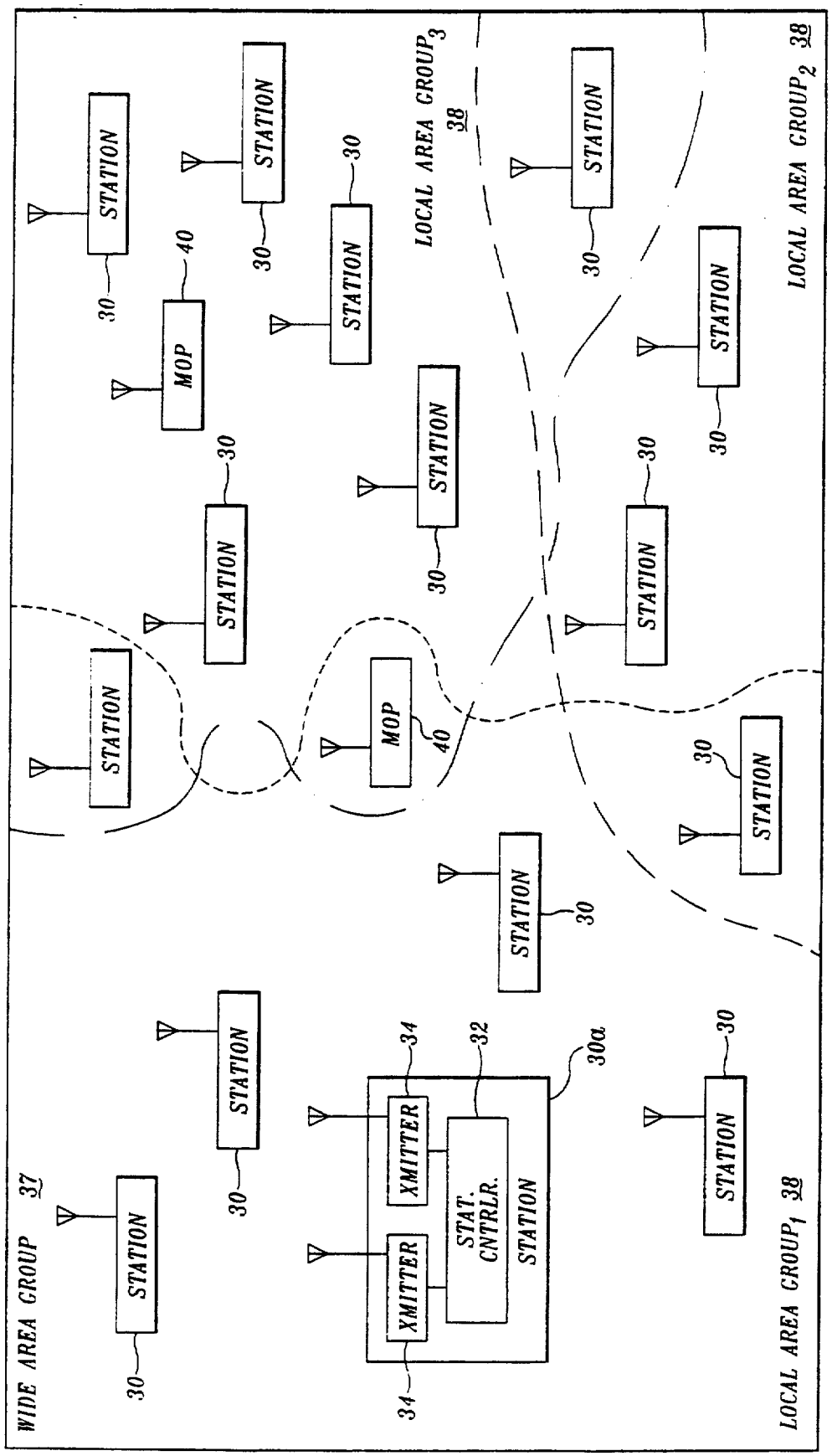
FIG. 2 is a block diagram illustrating how a plurality of local area groups of stations comprise a single wide area group of paging stations.

The system 20 of this invention is capable of forwarding pages for simulcast to the stations 30 located in one or more wide area groups (WAGs) 37 of stations, one of which is illustrated in block form by FIG. 2. Each WAG 37 includes a number of stations located in a particular, relatively large geographic area. Depending on the availability of paging frequencies, there may be multiple WAGs 37 in a single geographic area. The stations 30 within each WAG 37 are further broken down into small geographic subgroups called Local Area Groups (LAGs) 38. Some individual stations 30 may belong to two or more LAGs 38. Individual stations 30, though, do not normally belong to multiple WAGs 37.

Each station 30 is provided with at least one transmitter 34. When the system 20 of this invention is employed as a paging system, one type of transmitter that may be employed is a QT-7995 transmitter manufactured by Glenayre Electronics of Quincy, Ill., which broadcasts signals that have a carrier frequency of approximately 900 MHz. Transmitter 34 is capable of broadcasting signals in any format in which they can be processed by the complementary pagers 29. For example, some transmitters are capable of broadcasting analog signals, two-level frequency shift digital signals, four-level frequency shift signals, and/or ERMES-format signals. Also, as represented diagrammatically by station 30a, some stations may have two or more transmitters 34. These stations 30a are able to transmit signals over two distinct, non-interfering carrier frequencies simultaneously. Station 30a is thus capable of receiving and broadcasting pages that are to be transmitted simultaneously through the stations associated with two separate WAGs 37.

Also depicted by FIG. 2 are two maintenance operating points (MOPs) 40. Each MOP 40 is adapted to receive radio signals from one or more stations 30 over the frequency over which the pages are broadcast and-/or a frequency distinct from that over which paging signals are broadcast. The MOPs 40 monitor the performance of the individual stations 30 and further receive status information from the stations regarding the operating state of the stations. The MOPs 40, in turn, forward the information about the performance and operating states of the associated stations 30 back to the hub 28, which responds as is appropriate.

Figure 3:
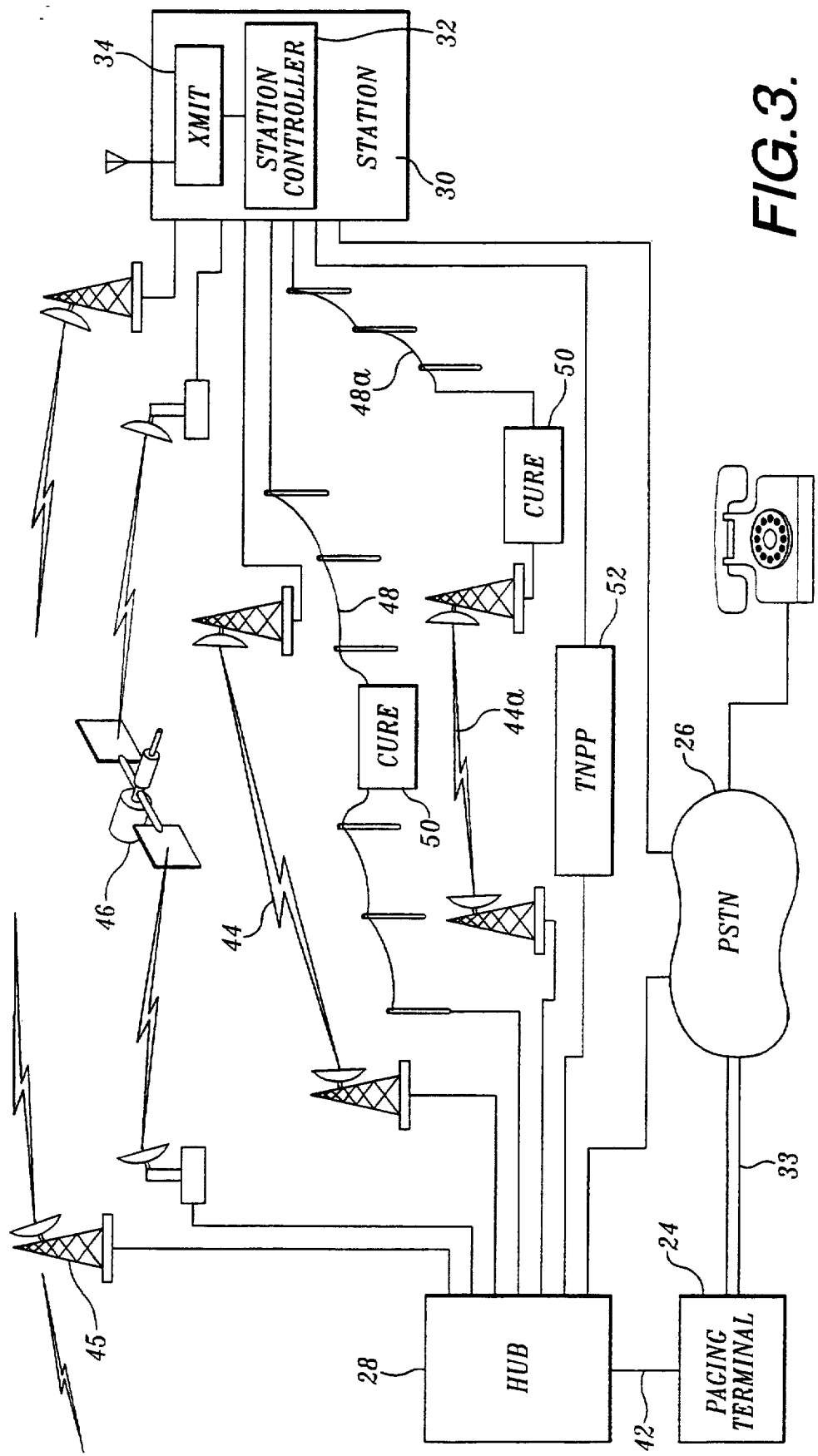
FIG. 3 is a diagrammatic view of the publicly switched telephone net-work-to-station interconnections established by the broadcast system of this invention.

The PSTN 26-to-station 30 interconnections to one particular station transmitter 34 are illustrated diagrammatically by FIG. 3. Paging terminal 24 is connected to the PSTN 26 by a set of one or more trunk lines 33. The paging terminal 24 receives calls for paging system subscribers and in response to those calls generates pages. Each page is a set of signals that includes an address code to ensure that it is only processed by the pager 29 assigned to the subscriber for whom the page was generated. Each page may include a set of data words that selectively activate a display integral with the pager or cause the generation of a short voice message by an audio signal processor that may also be integral with the pager. One type of paging terminal 24 capable of generating such pages is the GL3000 paging terminal manufactured by Glenayre Electronics of Vancouver, British Columbia. The paging terminal 24 is capable of generating pages for subsequent broadcast by the stations 30 in one or more WAGs 37 or only selected LAGs 38 within a WAG.

The pages generated by the paging terminal 24 are in the form of digital or analog signals, depending on the signal-processing capabilities of the pager 29 assigned to a particular subscriber. The transmission rate, the baud rate, of digital signals generated by the paging terminal 24, will vary with respect to the pager 29 assigned to a particular subscriber because the individual pagers respond to signals sent according to different protocols. Some pagers 29, for example, respond to signals sent according to the POCSAG protocol. This protocol requires signals to be sent to particular pagers at a baud rate of 512, 1200, or 2400. Other pagers process information sent according to the GOLAY ® protocol. A page sent according to this protocol has a first portion that is broadcast at a baud rate of 300 and a second portion broadcast at a baud rate of 600. The paging terminal 24 generates the page at the appropriate baud rate(s) based on internally stored information about the pager 29 assigned to the subscriber. Once the paging terminal 24 generates the pages, they are forwarded to the hub 28 over a hard wire communications link 42. When forwarding pages to the hub 28, the paging terminal 24 transmits signals to the hub informing it of the frequency at which the pages should be transmitted, the mode of transmission, and the group of stations 30 over which the pages should be broadcast. As will be described hereinafter, the hub 28 packages a set of pages into one or more PDBs 36; the hub then forwards the PDBs 36 to the stations 30 for broadcast.

The PDBs 36 are forwarded from the hub 28 to the station 30 over one or more link channels. Each link channel serves as the communications pathway to a particular set of one or more stations 30. The stations 30 may or may not be in the same WAG 37 or LAG 38. One such link-channel can be a microwave communications link 44; another channel can be a satellite broadcast network 46. A radio broadcast system 45, which operates at a different frequency from that over which the pages are broadcast to the pagers 29, can also serve as a link channel. An advantage of employing a radio broadcast system 45 as a link channel is that a single transmitter associated with the hub 28 can be used to forward pages to a number of different stations 30. Dedicated leased telephone lines 48 can form still another link channel, and the PSTN 26 can serve as a link channel wherein it is selectively accessed when needed by the system 20. A link channel may also be created from different segments wherein, in each segment, the signals may be transferred over a different communications medium. FIG. 3 illustrates one such link that includes a microwave segment 44a and a shortened dedicated land line segment 48a. At the point where the two segments 44a and 48a interconnect, there is a converter uplink repeater (CUE) 50. The CUREs 50, only two shown, convert the PDBs 36 into the appropriate format so that they can be retransmitted over the downstream links. The CURE 50s also perform error correction processing on the PDB 36 to ensure that the data in the PDBs processed by the station controllers 32 are identical to the data placed in the PDB by the hub 28. CUREs 50 may also be installed between the individual segments of a homogeneous hub-to-station communications link as is shown with respect to the leased telephone lines 48.

The PDBs 36 may be forwarded to the station 30 over a single link channel or over multiple link channels. When PDBs 36 are forwarded over multiple link channels they may be transmitted to the stations in accordance with a link-spreading protocol wherein some PDBs are sent over one link channel while other PDBs are sent over one or more other link channels. According to one such protocol, for example, in an ordinal sequence of PDBs 36, the first and third PDBs may be forwarded to the station over the microwave link 44 while the second and fourth PDBs are forwarded over the dedicated land line link network 48. Alternatively, each PDB 36 may be sent to a station 30 over two or more link channels so that the station receives multiple copies of the same PDB. For example, each PDB 36 may be sent to a station over both microwave link 40 and through satellite link 46. In a similar vein, there may be instances where a first link channel functions as the primary hub-to-station communications path and a second link channel serves as a secondary signal path that is employed only when signals cannot be transferred along the primary path. In some versions of the system, the satellite network 46 may serve as the primary link channel to two or more station controllers 32. In the event signals cannot be transferred over the satellite network 46, the system may be configured so that the signals to some station controllers are transferred over the PSTN 26 and the signals to other station controllers are transferred over the link that consists of a microwave segment 44a and a dedicated land segment 48a. Pages and other signals are broadcast over the link channels at a rate faster than the rate at which the pages themselves are broadcast by the stations 30. This ensures that the pages will be received by the stations 30 before the time they are intended to be broadcast and further allows the interleaving of command and system state information with the forwarding of the pages to the stations.

The stations 30 and CUREs 50 also exchange unit status information with the hub in addition to merely serving as links through which pages are broadcast. The stations 30 and CUREs 50, for example, inform the hub 28 whenever they fail to receive their PDBs 36. Moreover, the MOPs 40 inform the hub 28 about the operating state of the stations they are arranged to monitor. The hub 28 also provides software instructions to these units. These bi-directional communications to some of the distal units occur over certain types of the link channels, such as the microwave network 44, which allows for duplexed communication. This signal exchange between the hub 28 and the other units is through a link 52 depicted in block form as the Telocator Network Paging Protocol (TNPP) link. Link 52 is referred to as the TNPP link because in one version of the invention signals are exchanged over this link according to the Telocator Network Paging Protocol. This Protocol is normally used to regulate signal exchange between paging terminals. In this system 20, the TNPP is used as the protocol under which units distal to the hub 28 transmit status reports to the hub. The units distal from the hub 28 with TNPP link 52 reception capabilities may also receive commands from the hub over this link. Physically, the TNPP link 52 may be any convenient communication medium separate from the link channels. For example, in one construction of the invention, the stations 30, during idle times between the broadcast of paging signals, sequentially broadcast unit state information to the local MOP 40. The MOP 40, in turn, forward s the system state information back to the hub 28 over any convenient communication link, such as a microwave network or through the PSTN 26. Alternatively, the TNPP link 52 for a particular set of stations 30 and CUREs 50 may comprise either a leased land line link or a dialup link that is selectively established through the PSTN 26.

II. The Hub

Figure 4:
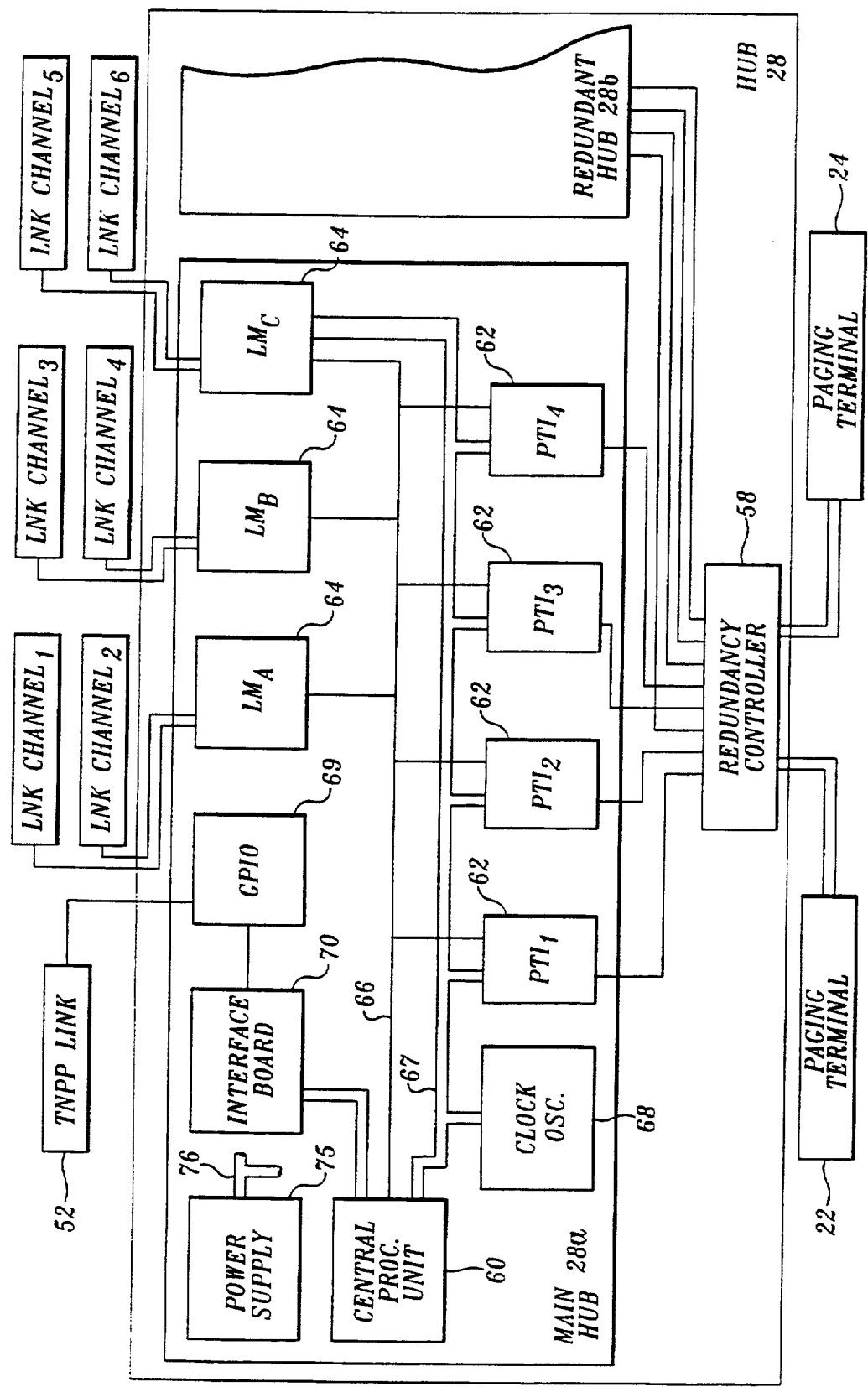
FIG. 4 is a block diagram view of the major components of the hub of the system of this invention.

The hub 28, as depicted by FIG. 4, actually includes main hub 28a and a redundant hub 28b that is identical to the main hub 28a. Both hubs 28a and 28b are connected to the paging terminals 22 and 24, and both are connected to the link channels$_{1-6}$ over which PDBs are transmitted to the stations 30. The twin hubs 28a and 28b are provided so that, in the event one hub fails, the other hub will forward PDBs to the stations 30 so that the broadcast of pages will not be interrupted. As will be described hereinafter, a redundancy controller 58 serves as the interface between the hubs 28a and 28b and the link channels in order to ensure that PDBs 36 from a single hub 28a or 28b will be forwarded to the stations 30.

Since main hub 28a and redundant hub 28b are identical, only the main hub 28a is illustrated and described in detail. The main hub 28a includes a central processing unit 60 that controls the overall operation of the simulcast system 20 There are a number of paging terminal interface boards (PTIs)62. Each PTI 62 is connected to a single paging terminal 22 or 24, through the redundancy controller 58 for receiving the pages generated by that terminal that are to be broadcast by the stations associated with a particular WAG 37. In the illustrated version of the invention, each paging terminal 22 and 24 generates pages for broadcast over two separate WAGs 37. The pages for the individual WAGs 37 are forwarded to the hub 28 through separate PTIs 62. Collectively, system 20 is capable of controlling the simulcast broadcast of pages over four separate WAGs 37 that are received by the hub 28 through four PTIs 62, PTIs$_{I-IV}$. A set of link-modems (LMs) 64 serve as the interface between the hub 28a and the link channels. Each LM 64 serves as the interface through which signals are exchanged between the hub 28a and the distal stations 30 over two link channels. In hub 28a, the hub-to-station PDB 36 occurs over six different link channels, (link channels$_{1-6}$). Therefore, the hub 28a has three separate LMs 64 (LMs$_{A-C}$) over which signals are exchanged between the hub and the different link channels. In some versions of this invention, a particular link channel may be configured for duplex signal transfer. In these versions of the invention, station 30, MOP 40, and CURE 50-to-hub 28 communication occurs over the duplex link channel and the associated LM 64 serves as the port through which the signals are forwarded to the hub central processing unit 60. The LMs 64 also add error correction material to the signals transmitted by the hub. The error correction material is used by the CUREs 50 and the station controllers 32 to correct any errors that develop in the PDBs 36 as a result of their transmission over the link channels to the stations 30. Signals are exchanged between the central processing unit 60, the PTIs 62, and the LMs 64 over a serial-bit high-level data link control (HDLC) bus 66.

Hub 28a includes a clock-oscillator 68 that produces a periodically incremented time signal and a repetitive clocking signal. The time signal and clocking signals from the clock-oscillator 68 are forwarded to the central processing unit 60, the PTIs 62, and the LMs 64 over a clocking bus 67 that will be discussed hereinafter in the section of this disclosure directed to the different clock circuits of this system 20. A general purpose input-output board (GPIO) 69 serves as an interface between the hub 28a and the signals exchanged with the stations 30, the MOPs 40, and the CUREs 50 over the TNPP link 52. In other words, the GPIO 69 serves as the interface between the central processing unit 60 and the system command and status signals that are exchanged over the TNPP link 52. The GPIO 69 also serves as the interface to which a terminal for allowing operator control and monitoring of the simulcast system 20 of this invention is connected. An interface unit 70 functions as the serial/parallel interface between the parallel signal ports on the central processing unit 60 and the serial ports on the GPIO 69. The boards forming the hub are energized by a common power supply 75. The energization voltage developed by the power supply is distributed to the individual boards over a power supply bus 76, partially shown. The other units of this system have similar power supplies that, while they will not be discussed any further, perform the same energization functions as the hub power supply 75.

The HDLC bus 66 is a serial data link that connects the PTIs 62 and the LMs 64 with the central processing unit 60. Hub component state information, commands and queries from the hub central processing unit 60, and information exchanged between the hub 28a and the stations 30, the MOPs 40, and the CUREs 50 over the link channels$_{1-6}$ are exchanged over the HDLC bus 66. The latter type of signals includes both PDBs 36 and system commands that are sent from the hub 28a to the stations 30, MOPs 40, and CUREs 50. These signals also include state information that the units distal from the hub 28 send to the hub over the link channels$_{1-6}$ capable of duplex signal exchange. Data and commands are sent over the HDLC bus 66 in the form of HDLC frames 80, which are now described with reference to FIG. 5. A flag field 82 is located at the front end of the frame 80 to demark its beginning and end. In one version of the invention the flag field 82 is a specific eight-bit pattern. Only one flag field 82 is transmitted when HDLC frames 80 are transmitted back to back. To prevent the false detection of an end-of-frame flag 82, whenever the transmitting unit forwards data similar to a flag, it will "bit stuff" an additional signal into the data pattern following the data similar to the flag. When the data are received, the receiver will evaluate whether or not a particular sequence of bits constitutes a flag 82 by reviewing the last portion of the sequence. Based on this evaluation, the receiver will remove the stuffed signal and process the signals appropriately, recognize that the pattern is an end-of-field flag, or determine that it cannot properly characterize the bit stream and terminate the reception.

Following the flag field 82 are an address field 84 and a control field 86. The address field 84 is an eight-bit field that identifies the unit transmitting information to or receiving information from the central processing unit 60 over the HDLC bus 68. In the case of central processing unit-to-peripheral unit communications, the address field 84 contains the address of the recipient PTI 62 or LM 64. In the case of peripheral unit-to-central processing unit communications, the address field 84 contains the address of the transmitting PTI 62 or LM 64.

The control field 86 identifies the type of HDLC frame 80. There are two types of HDLC frames 80, reference frames and data frames. Reference-type HDLC frames 80 are sent by the central processing unit 60 to the hub peripheral units. Each reference-type HDLC frame 80 contains a command directing the receiving peripheral unit to transmit data to the central processing unit 60. These data may be PDBs 36, peripheral state information, or state information about a distal component of the system 20 from which the peripheral unit, an LM 64, receives information. Implicit in each reference-type HDLC frame 80 is the message that the receiving peripheral unit should be the next unit to transmit an HDLC frame 80 over the HDLC bus 66. The data-type HDLC frames 80 are transmitted from the central processing unit 60 to the peripheral units and from the peripheral units to the central processing unit. The data-type HDLC frames 80 contain the actual data that are transmitted between the central processing unit and the peripheral units.

A data field 88 follows the control field 86. Data fields 88 in reference-type HDLC frames 80 contain sequencing information to ensure that the frames are forwarded and processed in the correct order by the units forming the hub 28. In some versions of the invention the sequencing information may be contained in the control field 86 or omitted altogether. In these versions of the invention, the data field 88 of the reference-type HDLC frame 80 may be left empty or may not even be created. Data fields 88 for data-type HDLC frames 80 contain information to be transmitted over the link channels$_{1-6}$, such as PDBs 36, information received from over the duplex-type link channels$_{1-6}$, information regarding the operating state of the sending PTI 62 or LM 64, or control information directed to the recipient PTI or LM. The data fields to the LMs 64 may also contain commands that control the exchange of signals over the link channels with which the recipient LM is associated. Some of the commands transmitted to the LMs 64 to control link channel signal transfer include commands that establish: the baud rate at which signals should be transmitted over the link channel; the signal level at which the signals should be transmitted; and the configuration of the link channel and/or the LM. Still other commands are further sent to the LMs 64 to cause the RF-transmitters of the RF-type link channels to periodically generate their Morse code station identifiers in order to comply with regulatory requirements. There are also commands that are used to selectively key and unkey the link channel transmitters and/or that are used to control the establishment or disassembly of a link channel. These commands are used to deactivate unused links so as to reduce the wear on dedicated RF transmitters and/or reduce the access costs for leased links like the PSTN 26. The information fields 92 for these commands contain arguments that are associated with the command. Either the data field 88 or the control field 86 for the data-type HDLC frames 80 may contain sequencing information to ensure the proper ordinal processing of the frames.

When an HDLC field 80 contains data to be transmitted, such as PDBs 36, to the downstream stations 30, the data field 88 contains an opcode 90 with a transmit data command. The information field 92 following the opcode 90 includes a length field 95, a control field 96, and a station packet 97. The station packet 97 contains the actual data to be transmitted to the stations 30. The length field 95 contains data that indicate the overall size of the station field 97. The control field 96 contains a message number 98, a message priority flag 99, and a channel number 100. The message number 98 indicates the ordinal position of the data in the packet field. The message numbers 98 are also used for flow control between the central processing unit 60 and the LMs 64; once an LM has processed a particular station packet 97, it sends a status message back to the central processing unit with the packet's message number to announce the successful processing of the packet. The message priority flag 99 indicates if the station packet 97 contains a PDB 36 or control information. This control information may, for example, include a software code for controlling the station that is to be downloaded into the station controller 32. The channel number 100 indicates over which link channel the LM 64 should transmit the station packet 97.

The last field in the HDLC frame 80 before the final flag field 82 is a check sum field 101. The check sum field 101 is a fixed-length field used to check for errors in the preceding fields. It is based on the preceding substantive bit stream. It is not based on the beginning-/end flag fields 82 or any bits that were entered as a result of bit stuffing.

Figure 6:
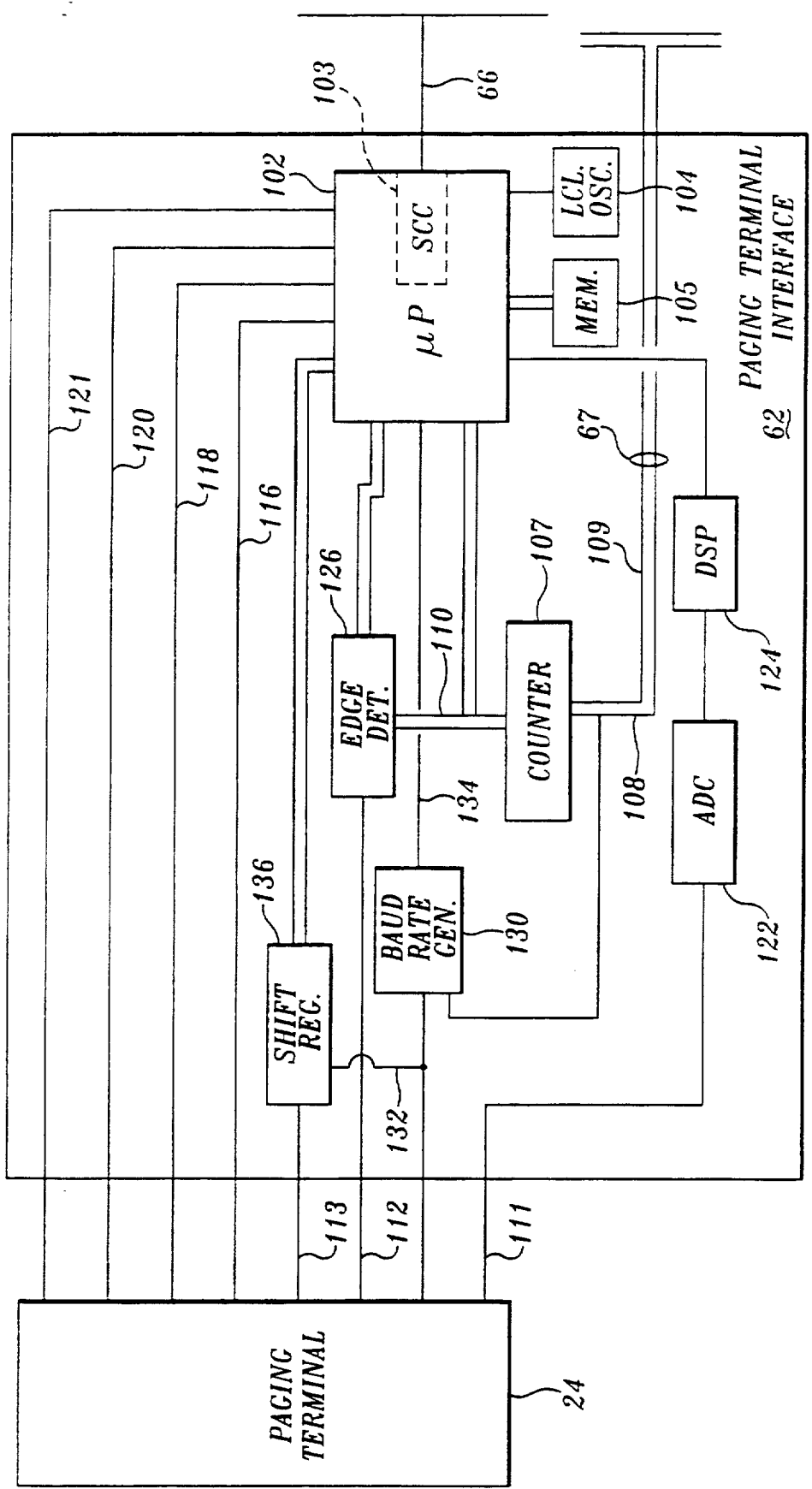
FIG. 6 illustrates in block diagram form a paging terminal interface.

FIG. 6 illustrates the structure of a PTI 62 and its connection to one of the outlet ports of paging terminal 24. The PTI 62 has a microprocessor 102 that receives the pages from the paging terminal 24, packages them into PDBs 36, and transmits them over the HDLC bus 66 to the hub central processing unit. In one version of this system 20, a MC68302 microprocessor manufactured by the Motorola Company of Schaumberg, Ill., is employed as the PTI microprocessor 102. Integral with the microprocessor 102 is a serial communications controller receiver-transmitter (SCC) 103. The SCC 103 serves as a parallel-to-serial signal converter for the signals that are generated by the PTI 62 for transmission over the HDLC bus 66 and as a serial-to-parallel signal converter for the signals received over the HDLC bus. Each of the separate hub 28 units connected to the HDLC bus 66 has a processor with a similar SCC for serial-to parallel and parallel-to-serial bit conversion.

A local oscillator 104 provides a clocking signal used to control the operation of the microprocessor 102. The PTI 62 has a number of random-access and read-only memories, represented by a single memory block 105, in which operating instructions for the PTI and data processed by the PTI are stored. As will be discussed hereinafter, two significant memory fields maintained by the microprocessor are the PDB buffer and the paging signal speed field. The PDB buffer is where digitized paging signals are stored prior to their forwarding to the central processing unit 60. The paging signal speed field is where the baud rate of paging signals in the PDB buffer are stored. A system clock time is supplied to the microprocessor 102 by a counter 107 integral with the PTI 62. The counter 107 is advanced by a clocking signal from the clock-oscillator 68 over a clocking signal line 108. Counter 107 is periodically initialized by strobe signals, also from the clock-oscillator board, that are received over a strobe line 109, which may be a multi-line bus. Collectively, the clocking signal line 108 and the strobe line 109 are both extensions of the clocking bus 67. The time signals generated by the counter 107 are forwarded to the microprocessor 102 over a time signal bus 110. In some preferred versions of this system, counter 107 is set to advance at a rate of either once every 100 nanoseconds, or once every microsecond.

The PTI 62 receives pages from the paging terminal 22 over one of three lines. Pages that are in an analog format are sent over an analog page-out line 111. Low baud rate digital pages, pages that broadcast at a rate of less than or equal to 2400 baud, are forwarded to the PTI 62 over a low-speed digital page-out line 112. High baud rate pages, pages broadcast at a rate of 2400 baud or greater, are forwarded to the PTI 62 over a high-speed digital page-out line 113. The paging terminal-to-PTI interface further includes a set of lines through which the paging terminal 24 transfers page control information to the PTI 62. Specifically, the frequency over which pages generated by the paging terminal 22 should be broadcast by the stations 30 is indicated by a signal transmitted to the PTI over a set of frequency select lines 116. The mode in which the pages should be transmitted (i.e., analog, low-speed digital, high-speed digital, two- or four-level frequency shift keying), is indicated by a set of signals forwarded from the paging terminal over a set of mode select lines 118. The particular LAGs 38 within a WAG 37 in which the pages should be broadcast is indicated by a set of signals transmitted over a set of zone select lines 120. In FIG. 6, the frequency select, the mode select, and the zone select lines, 116, 118, and 120, respectively, all extend directly from the paging terminal 22 to the PTI microprocessor 102. It should be understood that this is exemplary in that in some preferred versions of this invention one, two, or all of these lines may be connected to a register external from the microprocessor wherein they are temporarily buffered. In one preferred version of the invention, the frequency select lines 116 are in the form of a three-line signal bus, the mode select lines 118 are in the form of a three-line signal bus, and the zone select lines 120 are in the form of an eight-line signal bus. There is also a three-line ready bus 121 over which the PTI microprocessor 102 forwards PTI state signals to the paging terminal 22. These state signals include, for example, indications of whether or not the PTI 62 is ready to accept new paging signals for packetizing into PDBs 36.

The analog page-out line 111 is connected to an analog-to-digital converter (ADC) 122 or other converter that converts the analog signal stream into a digital signal stream. In one version of the invention, the output from the ADC 122 is a serial data stream. The digital data stream is supplied to a digital signal processor 124 that compresses the digitized signal into a serial digital stream that has a fixed baud rate approximately equal to the baud rate of the digital paging signals that are generated by the paging terminal 24. The compressed, digitized analog paging signals are forwarded to the microprocessor 102 for packaging into PDBs 36, as will be described hereinafter.

The low-speed digital paging signals are subjected to a data capture process wherein their baud rate is initially calculated and then the signals themselves are converted into an appropriate format for forwarding to the stations in a PDB 36. The low-speed digital page-out line 112 is connected to an edge detector 126 that monitors the 0-to-1 and 1-to-0 transitions of the paging signals generated by the paging terminal 24. A branch of the time signal bus 110 is also connected to the edge detector 126. Each time edge detector 126 senses a transition in the 0s/1s state of the paging signal, it latches the current time from the counter 107 and forwards the time to the microprocessor 102. Microprocessor 102, in turn, uses the latched time to analyze the rate at which the pages are generated by the paging terminal 24 in order to generate the individual PDBs, as will be described hereinafter.

The generation of the high-speed digital paging signals by the paging terminal 24 is controlled by a PTI baud rate generator 130 that generates a paging-signal accept rate signal to the paging terminal over a signal-out control line 132. A branch of the clocking signal line 108 is connected to the baud rate generator 130 for supplying a master clock signal upon which the paging-signal accept rate signal is based. The actual rate of the paging-signal accept rate signal is established by a set of baud rate control signals that are generated by the microprocessor 102 and are forwarded to the generator over a generator control bus 134.

The paging terminal 24, in response to and in synchronization with the signal rate out signal, forwards the high-speed digital paging signals out to the PTI 62 over the high-speed digital page-out line 112. The signals are forwarded to a PTI shift register 136 that is advanced by clocking signals from a branch of the signal-out-control line 132. The output from the shift register 136 is a multi-bit signal that is forwarded to the microprocessor 102 over a shift register bus 138.

When paging terminal 24 has created pages that need to be broadcast over the system 20, the paging terminal initially generates a signal to the PTI 62 over the mode select lines 118. The paging terminal 24 also generates a set of signals over the frequency select, mode select, and zone select lines, 116, 118, 120, indicating the associated characteristic of the paging signals. When the PTI 62 is ready to start accepting the pages, it informs the paging terminal 24 by generating a set of signals thereto over the mode-ready lines 121. In response to the characterizing information sent over lines 116–120, the PTI microprocessor 102 creates a control-type PDB 36a described with respect to FIG. 7. The control-type PDB 36a contains a mode field 140, a frequency field 142, a time field 144, and a zone field 146. The mode field 140 contains data that indicate the mode in which the subsequent data should be broadcast. The data in the mode field 140 also contain either an explicit or implicit transmit key/unkey flag that is used by the receiving station controllers to evaluate whether or not the associated transmitters should be turned on or turned off. In one version of the invention, data in the mode field 140 that indicates whether or not the following data should be transmitted in analog, low-speed digital, high-speed digital, or frequency shift format are read by the station controllers 32 to inherently include a "transmit-key" command. The frequency field 142 contains data that indicate over which frequency the data should be broadcast. The time field 144 contains data that indicate the basic time at which the transmitter should be turned on or off. The time contained within time field 144 also contains the base time upon which the stations 30 are to start transmitting the paging signals contained in the following PDBs 36. The zone field 146 indicates over which LAG 37, set of stations 30, or station the PDBs 36 should be broadcast. The control-type PDBs 36a of some versions of the invention may further include an address-type field, not illustrated, to indicate the specific attribute of the zone field 146. In other words, the address-type field will indicate if the zone field 146 contains an address for the address for a specific station.

Once the PTI 62 is actually ready to accept pages, a ready signal is generated to the paging terminal over the mode-ready lines 121. Generally, the PTI microprocessor 102 repackages the pages into data-type PDBs 36b described with respect to FIG. 8. Each data-type PDB 36b includes a start time field 150, a rate field 152, a length field 154, and a data field 156. The start time field 150 contains data that indicate when the downstream stations 30 should begin broadcasting the paging data contained within that PDB 36b. The PTI microprocessor 102 calculates the start time by adding a fixed value to the time at which it received the paging signal that corresponds to the first digitized paging signal in the PDB 36b. Generally, the delay is anywhere from 2 to 13 seconds. The delay represents the cumulative total of the time needed to forward the signals to the stations, which may be from 0.250 ms to 5 seconds, and any delay the operator has programmed into the system, which may be from 0 to 8 seconds. This delay is initially established by the system operator and then automatically added to the time the PTI 62 receives the initial paging signal that is packetized into a data-type PDB 36b. The rate field 152 contains an indication of the rate at which the paging signals should be broadcast. The calculation of this rate shall be explained hereinafter. The length field 154 contains an indication in bytes of the number of paging signals contained in the data field 156. The data field 156 contains the actual digitized paging signals that were generated by the PTI 62. These signals are the paging signals that, after their generation by the PTI microprocessor 102, are stored in the PDB buffer.

The actual method by which the PTI 62 processes, or "captures," paging signals so that they can be repackaged into PDBs 36b is a function of the type of paging signals generated by the paging terminal 24. Analog pages are supplied to the ADC 122 where they are digitized. The digitized paging signals are compressed by the DSP 124 so as to be in a digital data stream that is at a fixed baud rate equal to the baud rate of the digital paging signals generated by the paging terminal 24. The compressed digitized signals are packetized into PDB data blocks 36b by the microprocessor 102, wherein each data field 156 contains a pre-established maximum number of bytes of digitized, compressed paging signals. The rate at which the digital signal processor 124 generates the compressed paging signals is preestablished; microprocessor 104 automatically places that rate in the rate field 152 for each data-type PDB 36b created.

The PDB start time field 150 is supplied with a transmission start time based on the time the first digitized paging signal was received by the microprocessor 102 and the fixed transmission delay time. The value in the start time field 152 may be in one of two formats. In one version of the invention, the time field 144 of the initial control-type PDB 36a contains the most significant digits of the start time for the following paging signals. The start time fields 150 of the following data-type PDB 36b contain the least significant digits of the start time of the pages in the blocks with which they are associated. In a second embodiment of the invention, the time field 144 of the control-type PDB 36a contains a base time. The start time fields 150 of the data-type PDBs 36b, contain delta time values, which represent the difference between the base time and the time at which the associated paging signals should be transmitted. It should be understood that the format of data contained in the start time fields is fixed and that it does not vary with changes of the type of pages contained in the PDB 36b.

The capture of digital paging signals is a function of the baud rate of the signals. As will be described immediately hereinafter, the PTI 62 is able to monitor the 0-to-1 transitions of the low-speed signals, determine the transmission rate of the signals, and packetize the signals into data-type PDBs 36b. The high-speed digital paging signals are often generated at rates higher than that at which they can be efficiently analyzed by the PTI 62. These signals are loaded into the PTI microprocessor 102 through the PTI shift register 136 as will also be discussed in detail below.

Figure 9A:
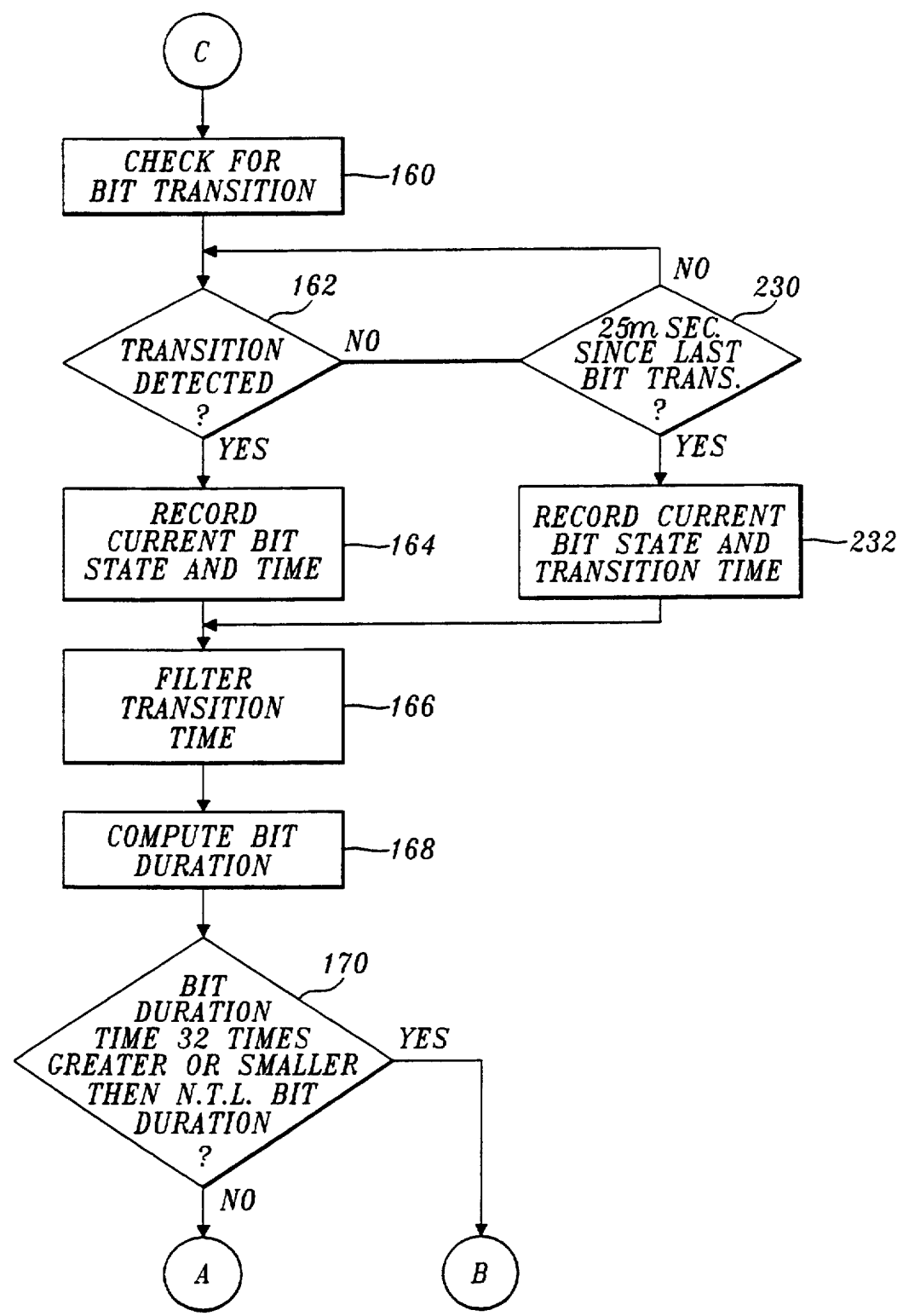
FIGS. 9A-9C represent in block diagram form the processing steps performed by the paging terminal interface to analyze, or capture, digital paging signals.
Figure 9B:
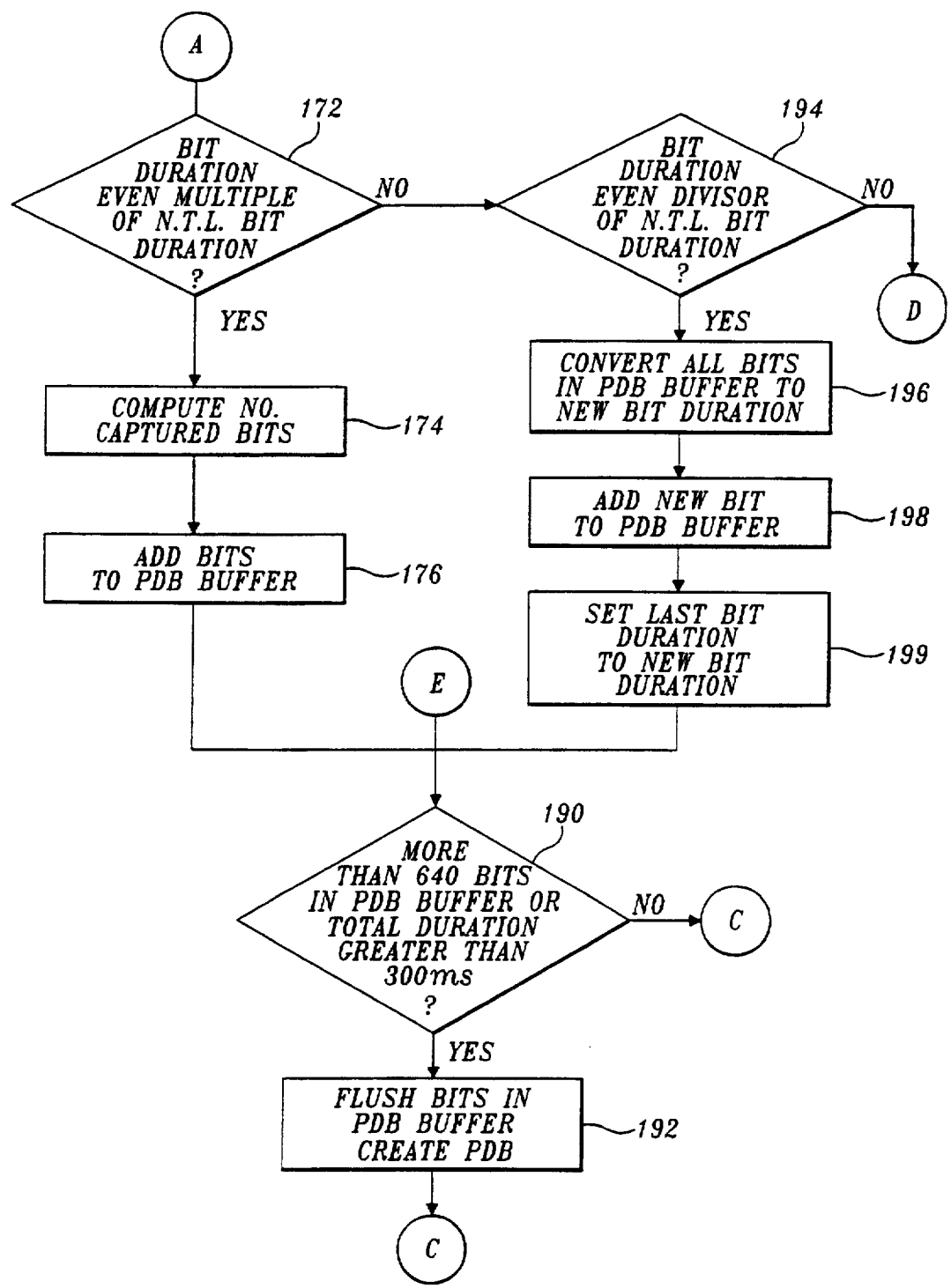
Figure 9C:
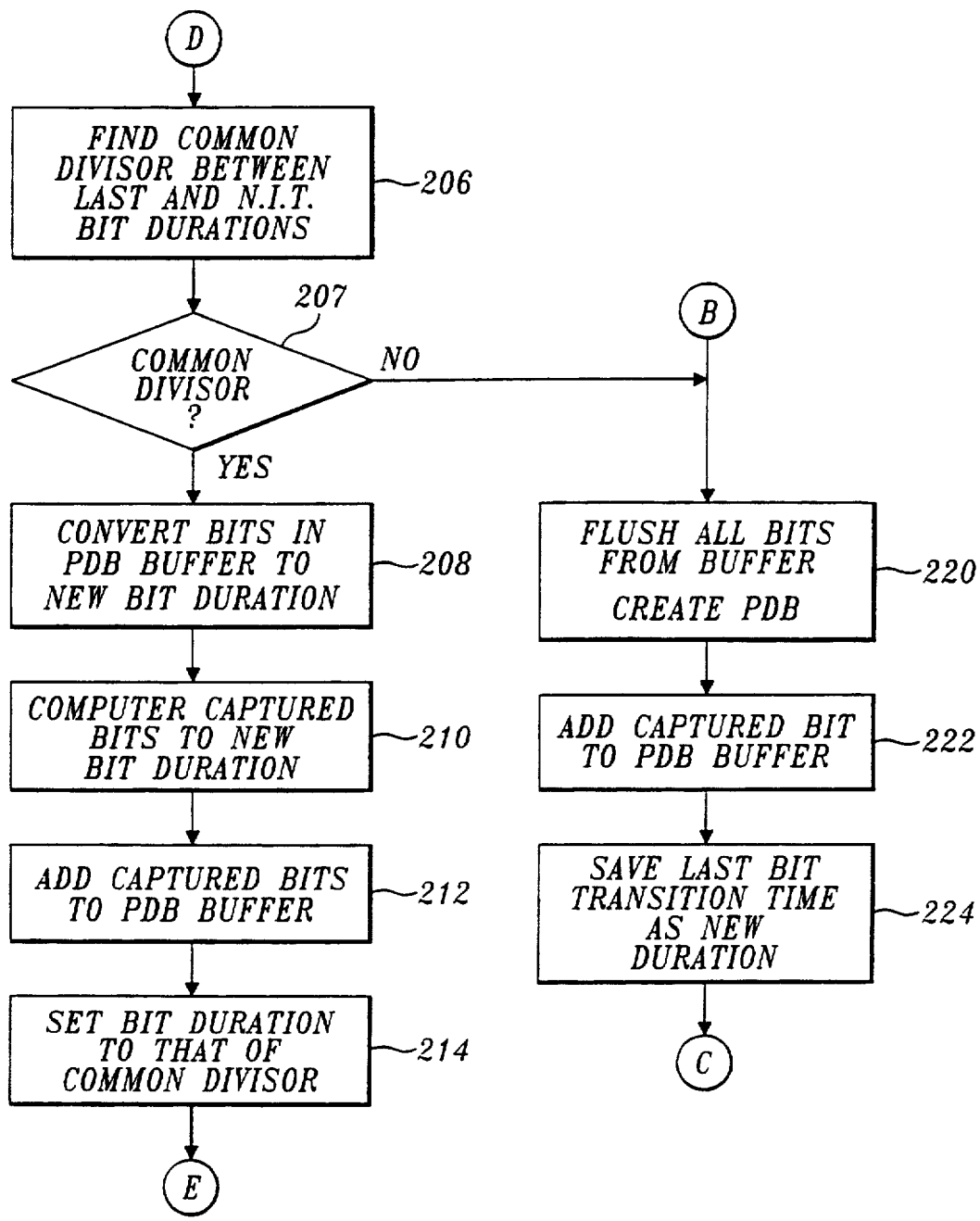

The capture of low-speed digital paging signals is now described with respect to the flow diagrams of FIGS. 9A–9C. As depicted in FIG. 9A, when the PTI microprocessor 102 is set to accept low-speed digital paging signals, it monitors the output signals of the edge detector for latched counter values that indicate when bit transitions occur as represented by step 160. Step 162 represents the processing that occurs when a bit transition is detected. The processing that occurs when no transitions are detected will be described hereinafter. When a transition is detected, the microprocessor stores the transition time and the bit state as represented by step 164. The bit state is based on the new state of data monitored by the edge detector. Thus, when the edge detector monitors a falling signal, from the "1s" state to the "0s" state, it is understood that the last bit or bits were "1s" bits. The transitions are also subjected to a filtering process represented by step 166. In one embodiment of the invention, filtering step 166 involves rounding off the transition time to a select number of microseconds. Other filtering processes can, of course, be employed.

Following the transition time filtering, a bit duration is computed, as represented by step 168. The bit duration is the time period the signal representative of the bit remains in one particular bit state. Bit duration is calculating the difference in time values between the time the bit transition was detected and the next-to-last bit transition time. The processing of the bit then becomes a function of the current bit duration and the bit duration of the previous, or next-to-last (NTL), bit. Initially, a comparison is made to determine if the last bit duration is greater than 32 times the next-to-last bit duration or less than 32 times the NTL bit duration as represented by step 170.

If the last bit duration is between 1/32 and 32 times the next-to-last bit duration, the PTI microprocessor 102 then determines if the last bit duration is an even multiple of the NTL bit duration as represented by step 172. If the last bit duration is an even multiple of the NTL bit duration, the microprocessor calculates the number of next-to-last bits to which the last bit was equal, as represented by step 174. In the next step 176, the microprocessor then adds the equivalent number of next-to-last bits to the PDB buffer. The microprocessor 102 also maintains the NTL bit duration as the bit duration for all the paging signals in the PDB buffer.

Figure 10A:
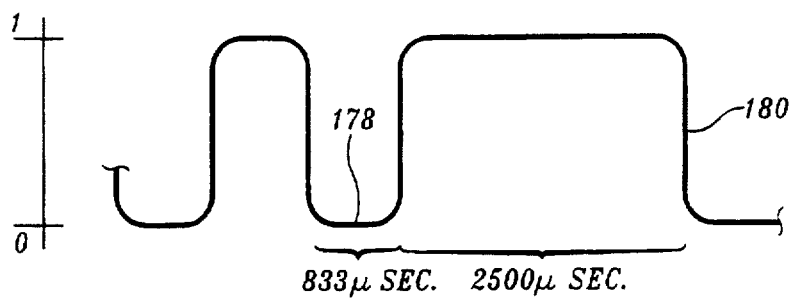
FIG. 10A illustrates the profile of one particular digital paging signal captured by the paging terminal interface.
Figure 10B:
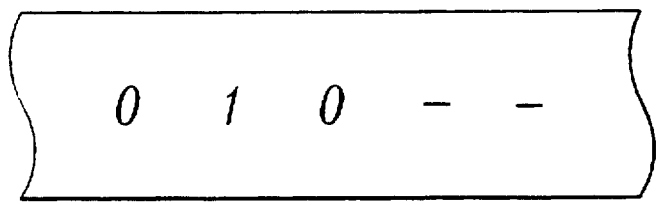
FIGS. 10B and 10C illustrate the contents of the PDB buffer before and after the capture of the digital paging signal of FIG. 10A.
Figure 10C:
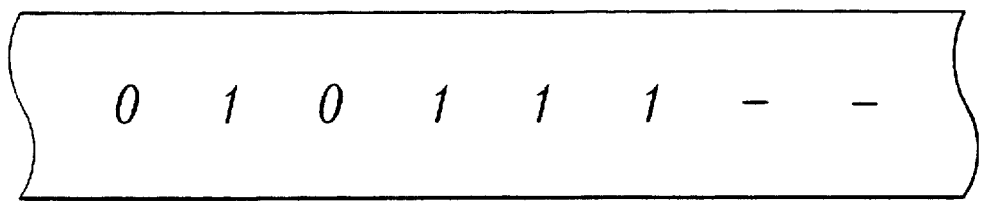

For example, FIG. 10A depicts a low-speed digital paging signal data stream wherein a NTL bit 178 had a bit duration of 833 microseconds (1200 baud). As represented by FIG. 10B, the NTL bit stored by the PTI microprocessor 102 in the PDB data buffer was a single 0 bit. The current bit 180 has a duration of 2500 microseconds (400 baud). The PTI microprocessor 102 determines that the duration of the last bit 180 was equal to:

$$\frac{2500}{833} = 3 \tag{1}$$

the duration of three 1200-baud bits. Accordingly, the microprocessor adds three "1s" bits to the PDB buffer as represented by FIG. 10C.

Returning to FIG. 9B, it can be seen that, after the additional bits are added to the PDB buffer, the microprocessor 102 determines if there are more than 640 bits in the PDB buffer or if the total duration of the transmission time of the bits in the buffer exceeds 300 ms. If these limits are exceeded, a data-type PDB 36b is created as represented by step 190. In the PDB generation process the first 640 bits are flushed from the buffer to form the data field 156. The rate field 152 for the PDB 36b is provided with a value that corresponds to the bit duration of the NTL bit. The length field 154 for the PDB 36b is filed with an indication of the number of signals in the data field 156. With respect to the example of FIGS. 10A–10C, the rate would be 1200 baud. Also, in step 192 the remaining, nonflushed bits are moved to the head of the PDB buffer to function as the initial data for the next-to-be created data frame. After the flushing, or if there is no flushing, the microprocessor 102 then waits until the next bit duration is reported.

If the last bit duration is not an even multiple of the NTL bit duration, PTI microprocessor 102 determines if it is an even divisor of the NTL bit duration as represented by step 194. If the last bit duration is an even divisor of the NTL bit duration, the PTI microprocessor 102 converts all the bits in the PDB buffer into a bit pattern representative of the new bit speed as represented by step 196. The new bit is then added to the PDB buffer as represented by step 198. As represented by step 199, the bit duration for that last bit is then stored as the bit duration for the bits in the PDB buffer. Then the 640-bits-in-buffer/300 milliseconds total duration time evaluation step 192 is executed. If there are more than 640 bits in the buffer, or the total duration time is greater than 300 ms, the create-PDB step 192 is executed wherein the rate field for the data block is provided with a data rate that corresponds to the bit duration for the last bit.

Figure 11A:
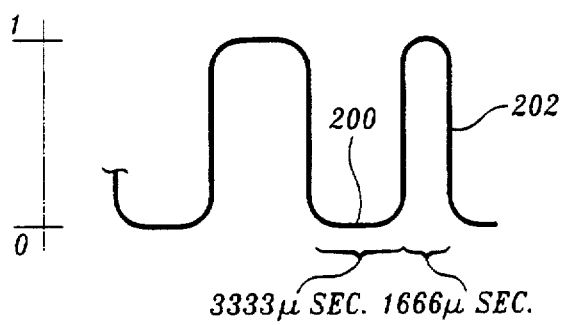
FIG. 11A illustrates the profile of another digital paging signal captured by the paging terminal interface.
Figure 11B:
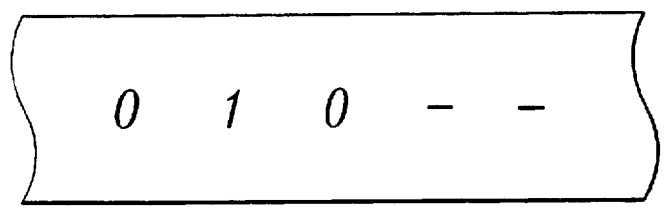
FIGS. 11B-11D illustrate the contents of the PDB buffer before, during, and after the capture of the digital paging signal of FIG. 11A.
Figure 11C:
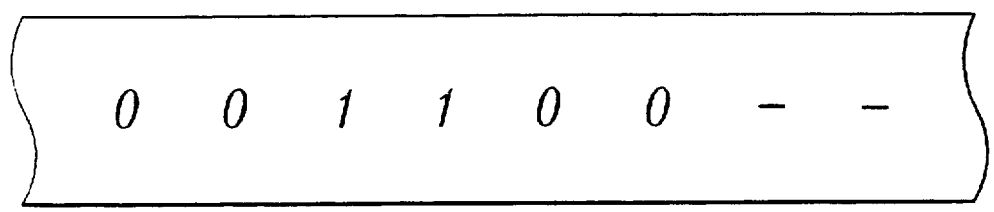
Figure 11D:
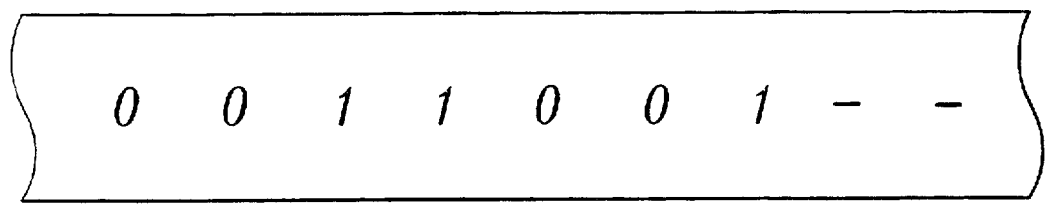

FIGS. 11A through 11D illustrate how this type of data capture is performed. FIG. 11A represents a signal stream out of the paging terminal wherein the next-to-last bit 200 has a duration of 3333 microseconds (300 baud). FIG. 11B represents the portion of the PDB buffer wherein the value for the next-to-last bit and the preceding bits are stored. As depicted by FIG. 11A, a last bit 202 has a duration of 1666 microseconds (600 baud). The PTI microprocessor 102 first determines that the duration of the last bit 202 is an even divisor of the transition time of the next-to-last bit 200. Specifically, the microprocessor 102 determines that the duration of the last bit is equal to:

$$\frac{1666}{3333} = \frac{1}{2} \quad (2)$$

or one-half the bit duration of the next-to-last bit 200. The microprocessor then converts all the bits currently in the PDB buffer to an equivalent number of bits for the shorter bit duration. In this instance, as represented by FIG. 11C, the PDB buffer is updated so that where there was one "0" bit there are now two "0" bits and where there was one "1" bit there are two "1" bits. Then, as represented by FIG. 11D, the last bit is added to the PDB buffer. If there are more than 640 bits of captured paging signals in the PDB buffer, or the total duration time of the bits in the buffer is greater than 300 milliseconds, the first 640 bits, or the bits needed to produce the first 300 ms of paging signals, are used to create a PDB data block 36b. The value placed in the rate field for that PDB 36b will be based on the bit duration for the last bit, in this situation, 600 baud.

If the last bit duration is neither an even multiplier nor an even divisor of the next-to-last bit duration, the PTI microprocessor 102 determines if there is a common divisor, greater than one and smaller than 32, of the two bit durations as represented by step 206 (FIG. 9C). If there is a common divisor, as represented by decision step 207, all the bits currently in the PDB buffer are converted into bits representative of their equivalents based on the common divisor represented by step 208. Then, as depicted by step 210, the last bit is convened into an equivalent number of bits based on the common divisor. After their conversion, the last bits are then inserted into the buffer as represented by step 212. A bit duration based on the common denominator is saved as the last bit duration, as represented by step 214. Step 190 is then executed to determine if there are more than 640 bits, in the PDB buffer or if the total duration time is greater than 300 ms. If it is necessary to create a PDB data block 36b, the rate field is filled with a value based on the calculated common denominator.

Figure 12A:
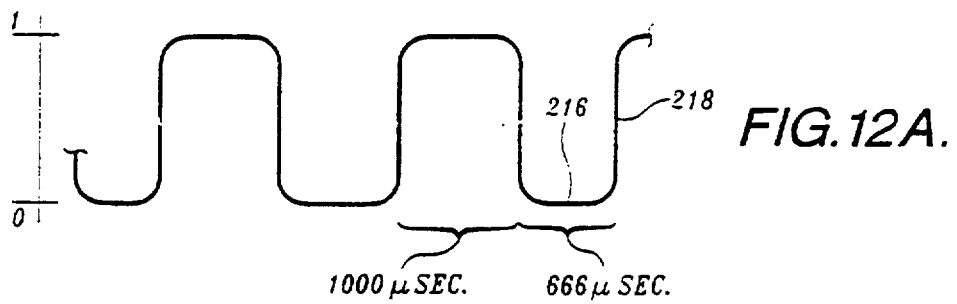
FIG. 12A illustrates the profile of another digital paging signal captured by the paging terminal interface.
Figure 12B:
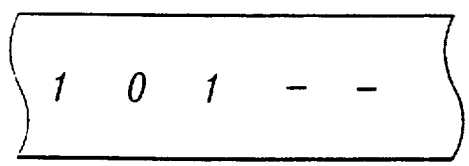
FIGS. 12B-12D illustrate the contents of the PDB buffer before, during, and after the capture of the digital paging signal of FIG. 12A.
Figure 12C:
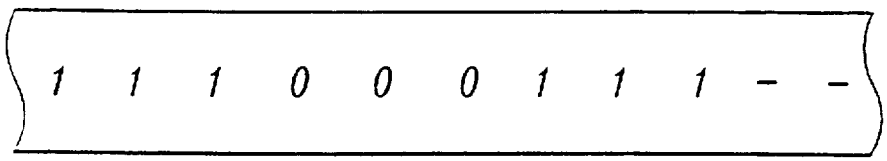

FIG. 12A illustrates a stream of paging signals out of paging terminal 24, and FIG. 12B illustrates the contents of the PDB buffer prior to the capture of the last bit. The data stream has a next-to-last bit 216 with a duration of 1000 microseconds (1000 baud) and a last bit 218 with a duration of 666 microseconds (1500 baud). Pursuant to step 206, the PTI microprocessor 102 determines that the NTL and last bit durations have a common denominator, 333 microseconds. This transition time is equivalent to a data transmission rate of 3000 baud. The microprocessor 102 then converts the bits already in the PDB buffer to their equivalents based on the baud rate of the common denominator time as represented by FIG. 12C. For example, the single "1" of the NTL bit is converted into three "1s". Then, the last bit is converted into its equivalent bit representation for the denominator baud rate. Here, the one "0" of the last bit is convened into two "Os". The converted bits are added to the PDB buffer as represented by FIG. 12C. If there are enough bits in the PDB buffer to create a PDB data block 36b, the rate field for the block 36b is supplied with the baud rate based on the common denominator, in this instance, 3000 baud.

In the event there is no common denominator between the bit duration of the last bit and the NTL bit, the assembly of the current PDB is completed and assembly of a new PDB is begun. This process is also performed when the difference in bit durations is less than 1/32 or greater than 32. The assembly of the current PDB is completed in this latter situation because the conversion of the bits in the buffer and the last processed bit into equivalent bits having a common duration could potentially result in the generation of more bits that could be stored in the buffer or packetized by the microprocessor 102. Initially, as represented by step 220 (FIG. 9C), the PDB buffer is automatically flushed at the start of the final assembly process of the PDB 36b. The rate field 152 for this PDB 36b is provided with the baud rate that was calculated based on the transition time for the NTL bit. The length field 154 is supplied with an indication of the number of digitized signals that are contained in the data field 156. The last bit is loaded into the PDB buffer as the first bit of the buffer, as represented by step 222. Then the baud rate of the last bit, based on its bit duration, and the time when the bit was received are saved, as depicted by step 224, to form the control data for the next data-type PDB 36b.

While PTI 62 creates most data-type PDBs 36b based on the edge transitions of captured low-speed digital paging signals, some PDBs 36b are also created even when no bit transitions occur. Specifically, as represented by step 230, if no bit transitions are detected, PTI microprocessor 102 determines how long it has been since the last bit transition. If the time period has been greater than 25 ms, the microprocessor assumes an automatic transition has occurred. The current time and bit state are recorded, as represented by step 232. The process then continues with filter transition time step 166. The process then continues with the compute bit duration step 168. This process is known as the generation of phantom bit transitions. The phantom bit transitions are generated to prevent the calculation of a baud rate by the PTI microprocessor 102 that is so low, the downstream processing equipment in the stations 30 cannot regenerate the paging signals.

Referring again to FIG. 6, if the paging terminal 24 has high-speed digital pages for broadcast over the stations 30, the paging terminal initially informs the PTI 62 of its state by transmitting the appropriate signals over the mode select lines 118. These signals, in addition to indicating that the paging terminal 24 has high-speed digital pages for processing, indicate the baud rate of the signals. When the PTI microprocessor 102 is ready to accept these paging signals, it informs the paging terminal 24 by generating the appropriate signals over the mode ready lines 121. The microprocessor 102 also forwards command signals to the baud rate generator 130 to direct it to generate clocking signals that are correlated to the baud rate at which the paging signals should be broadcast. The paging terminal 24 synchronously supplies the paging signals to the PTI 62 over the high-speed digital page-out line 113, in response to the clocking signals from the baud rate generator 130. The paging signals are loaded into the shift register 136. In response to the clocking signal from the baud rate generator 130, the shift register 136 places the paging signals in an eight-bit parallel form and forwards the resultant signal to the PTI microprocessor 102. The microprocessor 102 places the paging signals in the PDB buffer to form a data-type PDB 36b. The start time field 150 for the PDB 36b is provided with a start time based upon when the first paging signal was received by the microprocessor 102. The rate field 152 is supplied with a baud rate based on the baud rate information supplied to the PTI 62 by the paging terminal 24.

When the paging terminal 24 does not have any additional paging signals for system 20 to broadcast for that particular paging frequency, paging mode, and station set, it sends an end-page message to the PTI 62. In response, the PTI microprocessor 102 generates a control-type PDB 36a for forwarding to the stations. This PDB 36a contains a mode field 140 with a message directing the individual station transmitters to unkey, to shut down.

Figure 13:
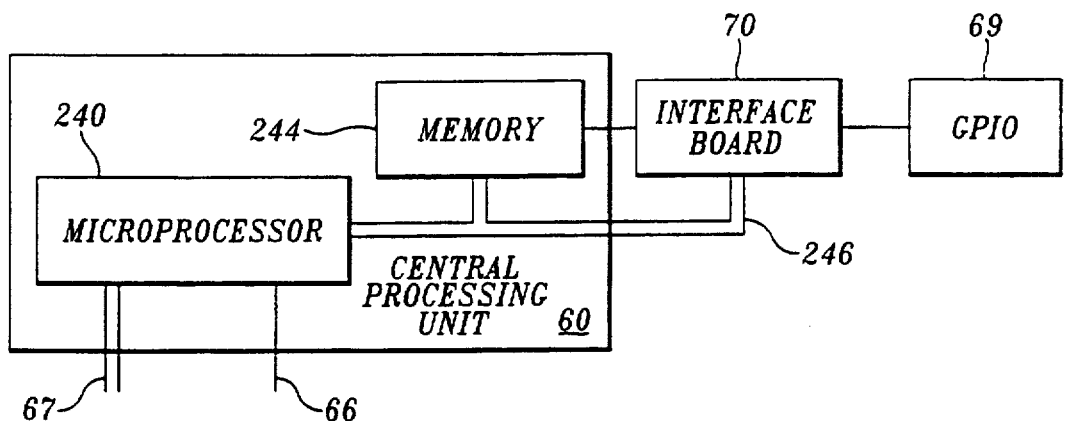
FIG. 13 depicts in block diagram form the hub central processing unit.
Figure 14:
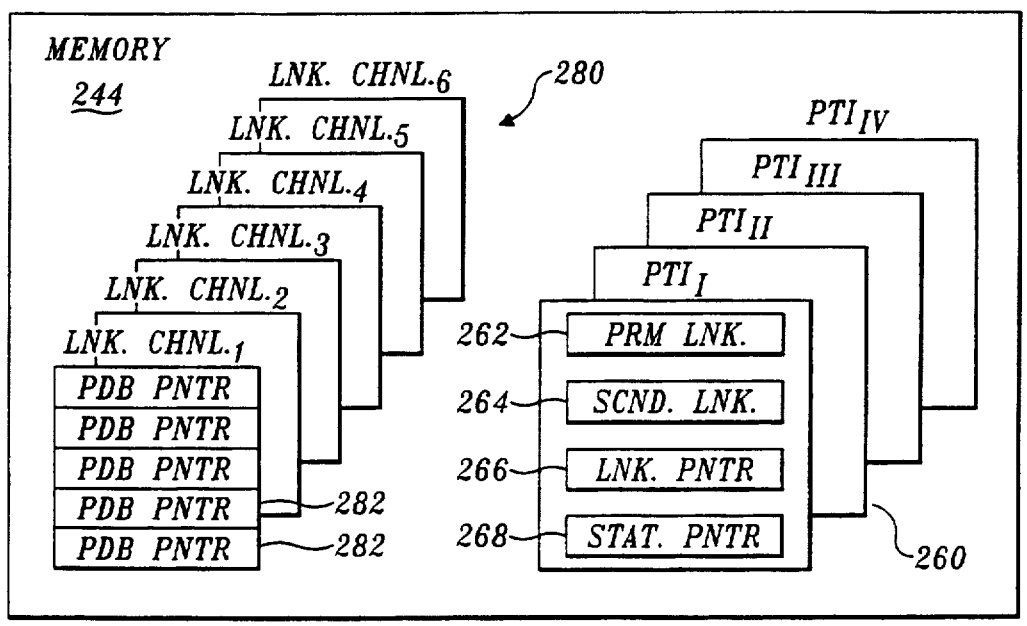
FIG. 14 depicts the link tables and link channel queues that are stored in the memory of the hub central processing unit.

The PDBs 36 once created by the PTIs 62 are placed in individual HDLC frames 80 and forwarded to the hub central processing unit 60, which is now described with respect to FIGS. 13 and 14. The central processing unit 60 includes a suitable microprocessor 240, such as the Motorola MC68302. A local oscillator, not shown, provides a clocking signal necessary to operate the microprocessor 240. The microprocessor 240 receives the system time from the oscillator and clock board over the clocking bus 67. The central processing unit 60 has both random-access and read-only memories, represented by memory block 244, in which both operating instructions, and the digitized paging signals that are to be processed according to those instructions, are stored. Bus 246 represents the address, data, and control signal interconnections over which signals controlling the storage and retrieval of data, as well as the data are exchanged. The central processing unit receives signals transmitted thereto over the TNPP link 52 through the GPIO board 69. The signals from the GPIO board are first forwarded over a VME bus 247 to the interface unit 70. The interface unit 70 converts the signals generated by the GPIO board 69 into a form where they can be processed by the microprocessor 240. The signals are forwarded to the microprocessor over bus 246.

The hub central processing unit 60 is a multitasking processing unit that controls the overall operation of the system 20. The hub central processing unit controls the communications that take place over the HDLC bus 80. It also coordinates the transmission of the PDBs 36 by the link modems to the stations 30s. It controls the synchronization of the clocks both at the hub 28 and at the stations, as will be described hereinafter. The hub central processing unit 60 also monitors and controls the other hub components with which it is integral and the other elements of the system 20 distal from the hub, the stations 30, the CUREs 50, and the units forming the hub-to-station links. Depending on the particular activities that occur at any of these locations, the hub central processing unit 60 will direct the unit to take appropriate remedial action and/or actuate alarms (not depicted) to draw the appropriate level of attention from the personnel monitoring the system.

The processing of incoming PDBs 36 from the PTIs 62 will now be explained with reference to FIG. 14, which represents a portion of memory 244. The central processing unit 60 maintains a set of link tables 260, wherein there is a link table for each PTI 62. Each link table contains a primary link field 262 and one or more secondary link field 264. The primary link field 262 contains an indication of through which link channel or channels the PDBs 36 from the associated PTI 62 should be forwarded to the stations 30. In the event the PDBs 36 are transmitted through multiple link channels, the primary link field 262 will indicate if there is redundant transmission of the PDBs 36, or if the PDBs are to be forwarded to the stations through link spreading. If the PDBs 36 from a particular PTI 62 are forwarded to the associated station in accordance with a link-spreading protocol, the link table 260 for that PTI will also include a link pointer 266 that indicates through which link channel the next-received PDB should be forwarded. The secondary link fields 264 indicate through which link channels the PDBs are transmitted in the event they cannot be transmitted through the primary link channel(s). There is also a station pointer 268 that indicates to which particular stations 30 the PDBs 36 from that PTI 62 should be forwarded. In versions of the invention where one PTI 62 processes all the pages that are to be simulcast by the stations in one particular WAG 37, the station pointer 268 contains an identifier common to all the stations in that WAG. In other versions of the invention, the station pointer 268 may identify a set of stations 30 either greater or less than the set of stations that are in a WAG 37.

In some versions of the invention, the primary and secondary link channels identified in the link tables 260 are fixed; they are established by the system operator and may be changed only upon the entry of explicit commands by the system operator. Alternatively, the hub central processing unit 60 may be provided with some type of protocol for selecting link channels over which the PDBs 36 from a particular PTI 62 should be forwarded to the associated stations 30 in the event the central processing unit receives an indication that messages cannot be transmitted over a particular link. Furthermore, it should be understood that the arrangement of the depicted link tables 260 is merely exemplary and that they may be arranged in other formats.

Memory 244 also contains a set of link channel queues 280. Each link channel queue contains PDB pointers 282 that identify the PDBs 36 that are to be forwarded to a single link modem. The pointers 282 more specifically identify where in the memory 244 the PDBs 36 with which they are associated are located. For example, in one particular configuration of the system 20, the PTI-to-link channel configuration may be as follows: from $PTI_I$, redundant distribution through link channel$_I$ and link channel$_3$; from $PT_{II}$, distribution solely through link channel$_4$; from $PTI_{III}$, 1:1 link spreading through link channel$_1$ and link channel$_2$; and, from $PTI_{IV}$, 2:1 link spreading through link channel$_2$ and link channel$_6$. Therefore, the queue 280 for channel$_1$ contains PDB pointers 282 for all the PDBs from $PTI_I$ and the first and third PDBs from $PTI_{III}$. The queue 280 for link channel$_2$ contains PDB pointers 282 for the second and fourth PDBs from PTI$_{III}$. The queue also contains the PDB pointers 282 for first and second PDBs out of every three PDBs that are generated by PTI$_{IV}$. Link channel's queue 280 contains pointers for all of the PDBs from PTI$_I$. These PDB pointers 282 are identical to the PTI$_I$ PDB pointers in the queue 280 for link channel$_1$. These queues 280 contain the same pointers 282 because PDBs with which the pointers are associated are sent in a redundant pattern to the stations for which they were created. The queue 280 for link channel$_4$ contains all the PDB pointers 282 for PDBs generated by PTI$_{II}$ and is the only queue where pointers from that PTI can be found. The queue 280 for link channel$_5$ does not contain any pointers; this link channel may be a secondary link channel, such as PSTN-type link channel, that is not used unless one of the other link channels fails. Link channel's queue 2 contains PDB pointers 280 for every third PDB from PTI$_{IV}$. It should further be understood that the queues 280 also contain pointers indicating where processor commands that are to be transmitted to the downline system components are located (pointers not illustrated). These pointers are created and placed in the queues 280 by the microprocessor 240 whenever the central processing unit 60 has such instructions that need to be forwarded to the downline components.

Whenever a particular LM 64 responds to a query from the central processing unit 60 indicating that it is available to accept data for downstream transmission over one of the link channels associated therewith, the processor 240, by reference to the appropriate link channel queue 280, retrieves the oldest stored PDB 36 or processor command and repackages it for transmission. The PDB or the processor command is placed in a station packet 300, described with respect to FIG. 15. Each station packet 300 includes an address-type field 301, an address field 302, a control field 304, and a data field 306. The address-type field 301 indicates the attribute of the address field 302. For example, the address-type field indicates whether the address field contains the address of a specific WAG 37 or a system address (all the stations associated with a particular system 20 of this invention) or a maintenance region, which may comprise a set of stations that may or may not be in different WAGs 37 and/or systems. The address field contains data that indicate the particular stations 30 that should process the remainder of the information contained in the packet. In station packets 300 that contain PDBs 36, the address field is based on the information contained in the station pointer field 268 for the PTI 62 that generated the PDB. The control field 304 indicates what kind of information is in the data field 306. Specifically, the control field 304 indicates if the data field 206 contains a control-type PDB 36a, a data-type PDB 36b, or processor instructions. The data field 306 contains either a PDB 36 or station soilware instructions.

Once the station packet 300 is created, it is placed into an HDLC frame 80 and transmitted to the recipient LM 64. More specifically, the station packet is placed in a data-type HDLC frame 80 with an initial opcode instructing the LM 64 to transmit the enclosed station packet and is sent to the appropriate LM, one of which is now described with reference to FIG. 16. Each LM 64 serves as an interface between the hub and two of the link channels over which data, including PDBs 36, are sent to the stations. The LM 64 includes a host port 310, through which HDLC frames 80 are exchanged with the hub central processing unit 60. Station packets are transmitted over the links through two serial ports 312, two radio/leased ports 314, and/or through dialup ports 316. Each serial port 312 serves as a port through which a serial stream of digitized signals is exchanged between the LM 64 and a link network, such as a satellite network 46, that is able to forward pages that are in this signal format. Each radio/leased port 314 serves as the port through which analog signals can be exchanged between the hub 28 and a communications link channel such as a microwave network or a leased fiber-optic network. The dialup ports 316 serve as the ports through which analog signals are forwarded over the PSTN 26 when the PSTN is employed as the link media. Signals are exchanged between the hub 28 and each of the two link channels associated with a particular LM 64 through a specific one of two sets of ports on the cards, wherein each set of ports includes one of the serial ports 312, one of the radio/leased ports 314, and one of the dialup ports 316.

Each LM 64 further includes a link card controller 318, an interface communications processor 320, two DSPs 322, and two CODECs 324. The link card controller 358 is a microprocessor, such as a MC 68302, that is driven by a local oscillator, not illustrated, to operate at 16 MHz. The link card controller 318 controls the overall operation of the link card. As part of its functions, the link card processes incoming HDLC frames 82. When the HDLC frame 80 contains a station packet 300 for downstream transmission, the link card controller strips away the HDLC header material. The link card controller 318 then places the station packet 300 in a link frame 328, which will be described hereinafter. The link card controller also establishes the link card-to-link channel connections and controls the rate at which signals are exchanged over the link channel. The link card controller 318 also serves as the interface between the link card and the serial ports 312. Whenever signals are exchanged over one of the ports 312, they are forwarded directly to or from the link card controller.

The interface communications processor 320 serves as a combined buffer memory-multiplexer through which signals are exchanged between the link card controller 318 and the DSPs 322. Interface 320 consists of two dual-port RAMs 330. Each RAM 330 serves as the interface between the link card controller 318 and one of the DSPs 322. The link card controller 318 exchanges signals with both RAMs 330 over a single bus 332 over which data and address signals are simultaneously transmitted. A separate control bus 334 controls which specific RAM 330 the link card controller 318 writes data to or reads data from.

Each DSP 322 processes the signals that are sent and received over a separate one of the link channels. The DSPs 322 digitally modulate the outgoing signals so that they can readily be placed in an analog form by the associated CODEC 364. The DSPs 322 also demodulate the incoming digitized signals received by the LM 64 over the link channels so that they will be in a form that can be processed by the link card controller 318. In one version of the invention, ADSP-2101 DSP processors manufactured by Analog Devices of Norwood, Mass., are employed as the DSPs 322. These processors are operated at a frequency that allows accurate generation of serial signals out of the modems at baud rates of 2400, 4800, 9600, or 19,200. A single crystal oscillator, not shown, is used to drive both DSPs 322.

The CODECs 324 perform the digital-to-analog conversion of the data from the associated DSP 322 so they can be forwarded over a link channel. The CODECs 324 also digitize the analog signals received over the link channel so that the data can be processed by the DSP modems 322. As part of the analog-to-digital signal conversion process, each CODEC 324 also filters the received signals. Each CODEC 324 is connected to a separate one of the radio/leased ports 314 and a separate one of the dialup ports 316 that, collectively with one of the serial ports 312, form the signal gateway to and from one particular link channel. Each CODEC 324 includes two DAC subcircuits and two ADC subcircuits in order to facilitate the exchange of signals over both of the ports with which the CODEC is associated. Each CODEC 324 further includes a tx-key output port over which a signal for controlling the on/off state of the associated link transmitter is generated and a squelch input port over which a squelch signal from the associated radio-leased teleco link is received. A suitable CODEC 324 for use on the link card is the CS4216 stereo audio CODEC from Crystal Semiconductor Corp. Transformer circuits, not illustrated, may be located between the CODEC 324 and the ports or between the ports and the communications link hardware to provide impedance matching between the hub 28 and the link channel hardware.

Figure 5:
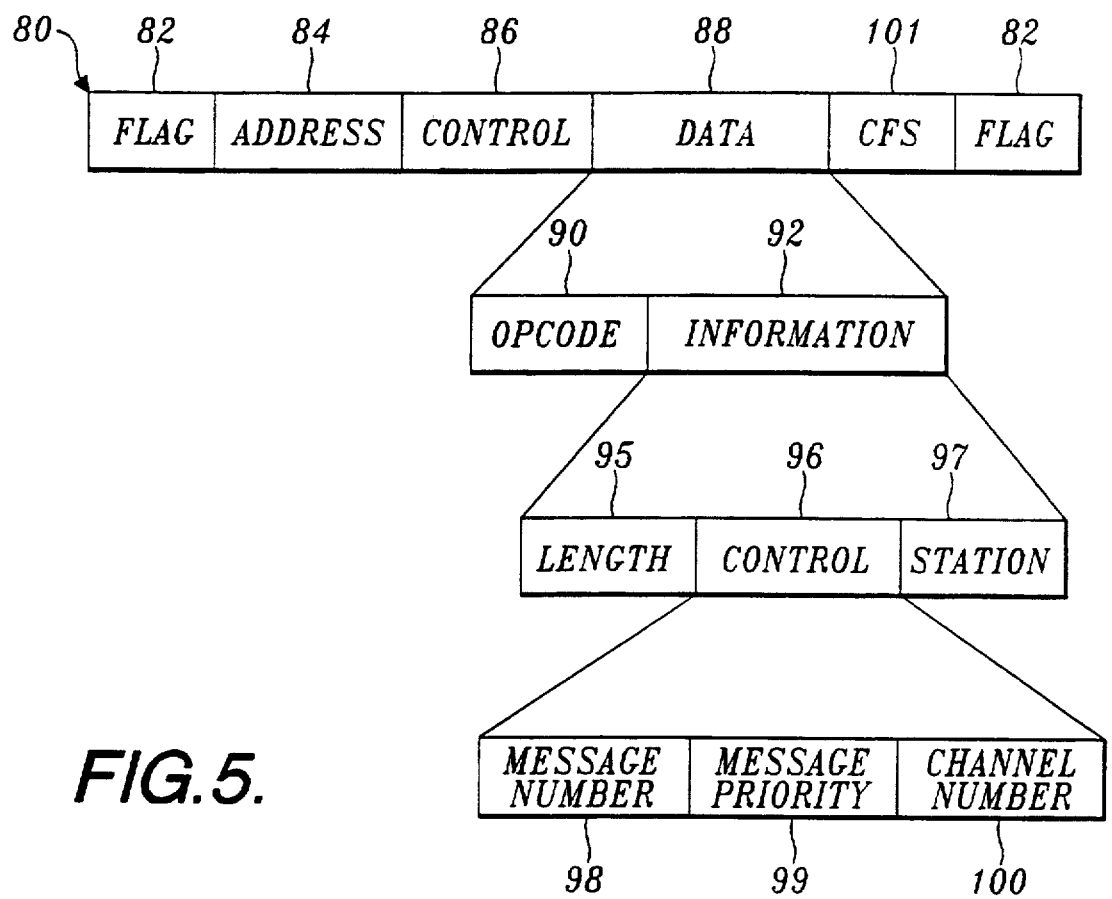
FIG. 5 depicts the elements of an HDLC frame.
Figure 17:
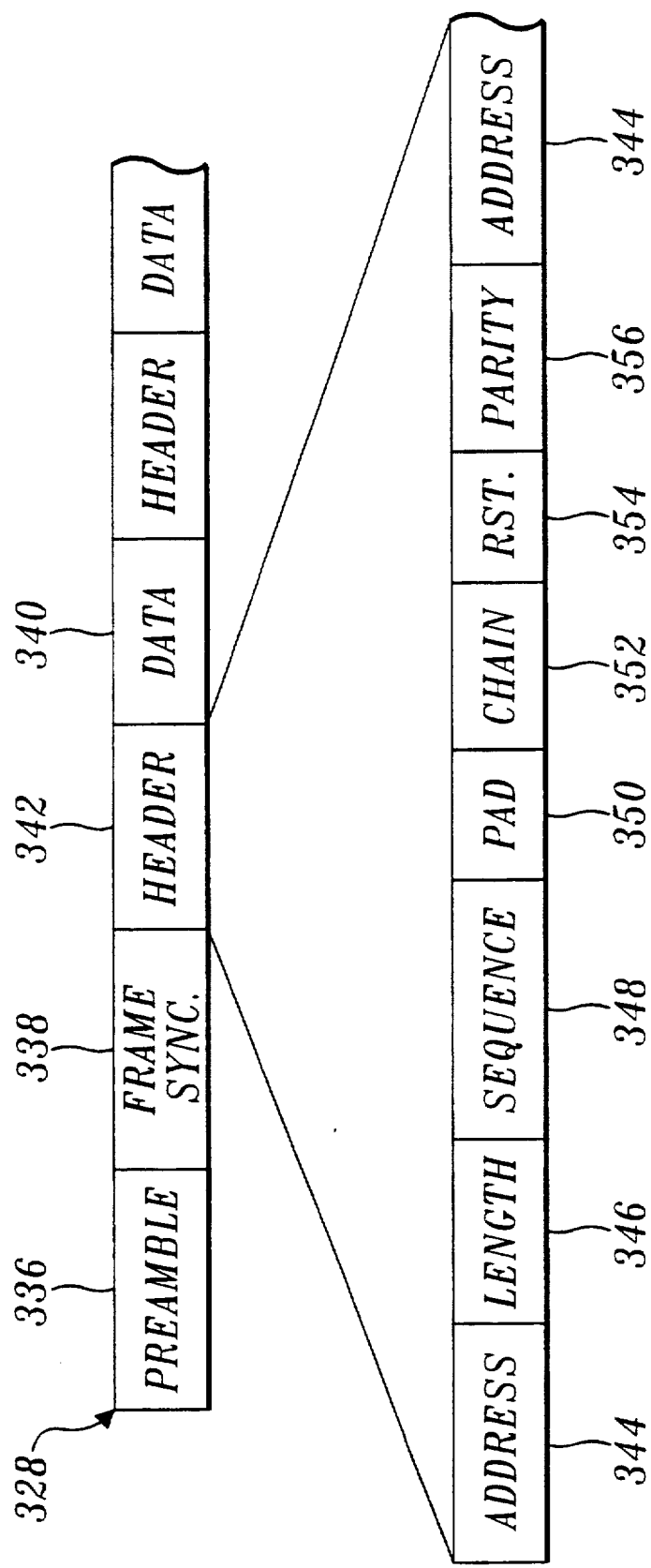
FIG. 17 depicts the structure of a link frame.

When the link card controller 318 receives an HDLC frame 80 with a PDB 36 or other data to be transmitted, it forwards the data to the appropriate link channel based on the instructions in the HDLC frame control field 96 (FIG. 5). Specifically, the channel number field 100 indicates which link channel the data should be transmitted over, or the serial port associated with a particular link channel that the data should be transmitted over. The link card controller 318 also takes the data out of the HDLC frames 80 that are contained in the station packets 97 (FIG. 5) and places them in a link frame 328, which is the block of signals that is actually transmitted over the actual hub-to-station link channels. As represented by FIG. 17, each link frame includes a preamble 336, a frame sync field 338, and at least one data field 340, each of which is preceded by a header field 342. The preamble 336 is transmitted at the beginning of the transmission over a link network to facilitate bit synchronization at the receiving demodulator. The preamble is not sent between frames transmitted back to back within a single transmission burst. The frame sync field contains a unique bit pattern used to denote the start of a new frame 328.

The header 342 contains control information used by the receiving stations 30 and CUREs 50 to ensure that the data in the frame are properly processed. Each link frame header 342 contains an address field 344 that identifies the particular stations and CUREs 50 that should process the remaining portions of the link frame 368. This address is provided in addition to the address contained in the station packet because there may be instances where different systems 20 are located in the same geographic area. Some of these systems may operate over radio-type link channels on frequencies that are not widely separated from each other. The address in this header 342 distinguishes between the receiving sites belonging to the different systems so that a station does not process a link frame 328 intended for a station 30 or CURE 50 in another system 20. A length field 346 contains data that indicate the length of the data field 340.

The sequencing of data contained within a set of link frames is controlled by the data contained in a frame sequence field 348 and a packet assembly/disassembly (PAD) field 350. The frame sequence field 348 indicates the ordinal rank of a frame when multiple frames are sent. The receiving station 30 or CURE 50 uses the information in the frame sequence field to evaluate whether or not it has received all the frames that it was sent or if it was sent duplicate copies of a particular frame. The PAD field 350 indicates whether or not the data in the frame comprise the whole of a data packet or only part of the packet. The dominant transmission will be of PDBs 36, each of which is contained in a single link frame. For these link frames, the PAD field 350 will indicate that the frame is the only frame of the packet. Some link frames 328, such as those that carry processor instructions, will carry only part of the packet. The PAD field 350 for those link frames 328 will contain a flag setting to indicate if the frame contains the first frame in a packet, an intermediate frame, or the last frame of a packet. The receiving station 30 or CURE 50 will use the information obtained from the flag setting and the ordinal information from the frame sequence fields 350 to place the packets in the correct order for processing.

Each link frame header 378 further includes a chain flag 352 and a reset flag 354. The chain flag indicates if another header 342 data field 340 pair is being sent in the frame after the associated data field 340 without a frame synchronization field located therebetween. The reset flag is used to reset all sequencing information, i.e., frame sequence and PAD state, at the receiving station. The header 342 also includes a parity field 356, as will be described hereinafter.

The data field 340 contains the actual information that is to be transferred to the recipient stations or CUREs. The data field 340 can be either 90 or 45 bytes in length. The header length field 346 indicates the length of the data field 340. Data fields 340 that are less than 45 or 90 bytes in length are padded with "0s".

Both the header 342 and data field 340 of the link frame 328 have some type of error control information. In one version of the system, control information in the header 342 is followed by the parity field 356, which contains data upon which the data comprising the control information in the header can be corrected. Also, triplicate copies of the control information and associated parity field are sent in each header 342. This is to allow the recipient station 30 or CURE 50 to provide error correction through two-out-of-three voting regarding any discrepancies in the received data. The data portion of the link frame is encoded in multiple error control blocks to facilitate its correction at the receiving site. For example, in one embodiment of the invention, each block can be a Reed-Solomon code word that uses five-bit symbols that contain 24 information symbols and 11 parity symbols. Such an arrangement would allow the receiving site to correct up to two symbol errors in a block. The blocks are interleaved at the symbol level. This enhances the likelihood that a noise burst will be dispersed over a number of different blocks, which would allow any errors in those blocks to be corrected, as opposed to being localized in one block and essentially destroying its contents beyond the point of recovery.

Figure 18:
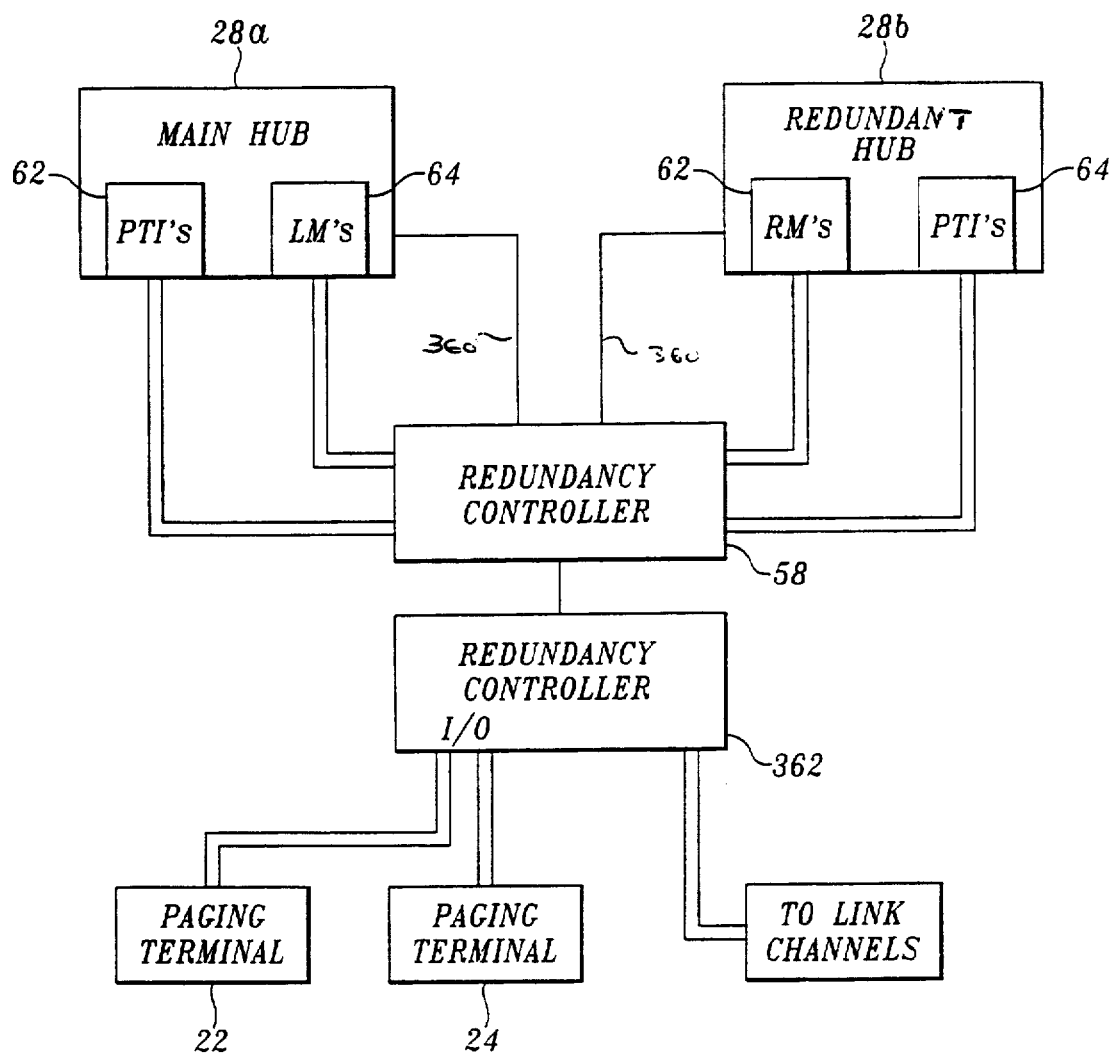
FIG. 18 is a block diagram depicting the relationship between the redundancy controller and the other central-station elements of this invention, the main hub, the redundant hub, the paging terminals, and the link channels.

Now referring to FIG. 18, the relationship between the main and redundant hubs, 28a and 28b, respectively, and the redundancy controller 58, is described. The redundancy controller 58 is any suitable processor that is capable of monitoring the operational state of the hubs 28a and 28b. The hubs 28a and 28b exchange status information and commands with the redundancy controller over a set of system state lines 360. The redundancy controller 58 is also connected to a redundancy controller input/output unit 362 to which both the paging terminals 22 and 24 and link channel transceiving equipment are also connected. The redundancy controller input/output unit 362 includes a set of 2:1 signal-routing switches. Some of the switches are used to establish from which hub, 28a or 28b, the paging signals and associated control signals are sent and received. The other switches are used to control from which hub, 28a or 28b, link frames 328 are sent out over the link channels.

Based on hub state information received over the state lines 360, the redundancy controller 58 establishes which hub, 28a or 28b, receives pages from the paging terminals 22 and 24 and forwards link frames 328 to the stations over the link channels. Based on this determination, the redundancy controller establishes the state of the switches in the redundancy controller input/output unit 362. In some versions of the invention, the redundancy controller input/output unit will always forward the paging signals to both hubs 28a and 28b so that both hubs generate PDBs 36. Since the clock-oscillators 68 and the individual PTI counters 107 in both hubs 28a and 28b are in synchronization, both hubs will generate PDBs 36 with the same pages that are to be broadcast at the same time. The system is further configured, though, so that the PDBs 36 produced by the redundant hub 28b will be stored by the hub central processing unit 60 for a select amount of time, for example, 200 to 500 ms longer than they are stored in the central processing unit 60 of the main hub 28a. During normal operation of the main hub 28a, the link frames 328 produced by the redundant hub link modems 64 are simply discarded by the redundancy controller 58. In the event the main hub 28a fails, the redundancy controller 58 immediately starts forwarding the link frames 328 generated by the redundant hub 28b over the link channels. Since the link frames 328 from the redundant hub 28b are identical to those produced by the main hub 28a, except that they are provided to the redundancy controller 58 at a slightly later time, there is no interruption in the transmission of paging data to the downstream stations 30.

III. The Stations

Figure 16:
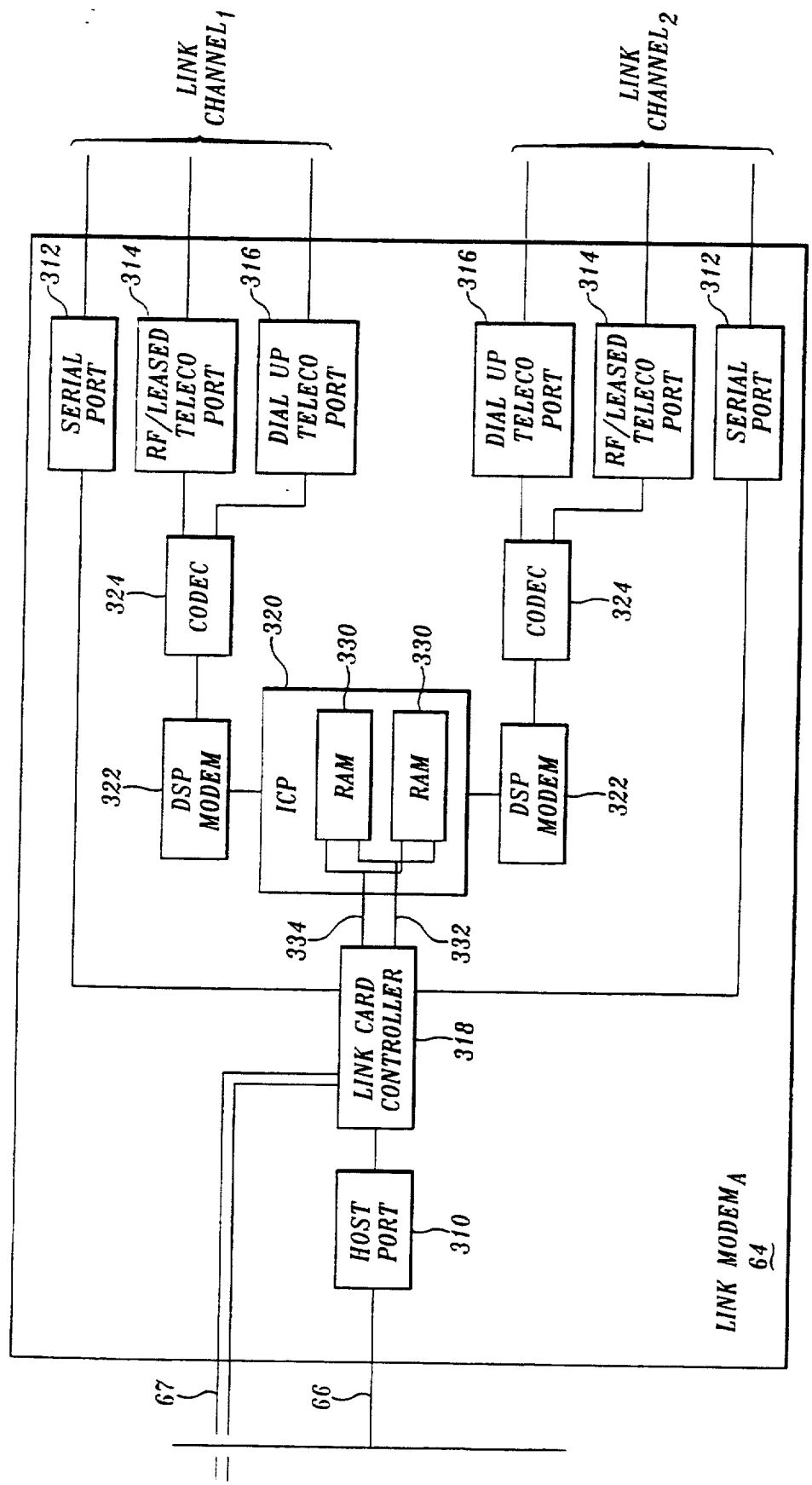
FIG. 16 depicts in block diagram form a link modem.
Figure 19:
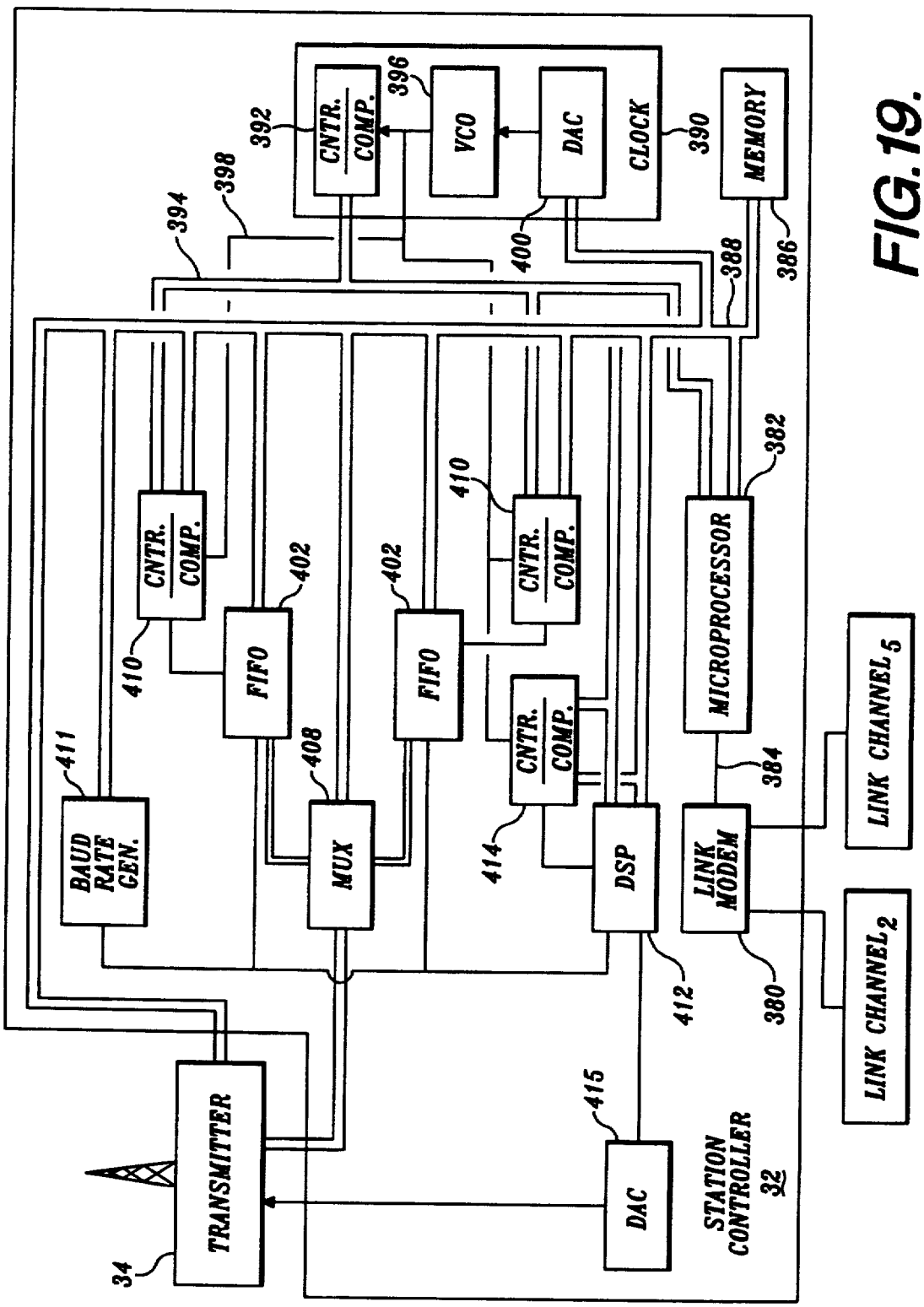
FIG. 19 depicts in block diagram form a transmitting station including the system controller through which paging signals are forwarded to a station transmitter for broadcast.

Upon formation by the hub 28, the link frames 328 are forwarded to all the stations 30 that are configured to receive signals from the link channel(s) over which the frames are transmitted. As depicted by FIG. 19, each station 30 includes a station controller 32 that processes the data received over the link channel(s) and at least one transmitter 34 that broadcasts any pages contained in the frames 328. The station controller 32 includes at least one link modem 380 and a processor 382. The link modem 380 processes the link frame s 328 received over the link channel(s) with which the station is associated. In the event a particular link channel is configured to allow duplex signal exchange, the link modem 380 similarly is capable of packetizing signals generated by the station controller 32 so that they can be forwarded to the hub 28. Link modem 380 is substantially identical in structure to the previously described hub link modem 64 (FIG. 16). When processing incoming link frames 328, the link modem 380 initially corrects the contents of the frame for any errors that may have occurred in its transmission over the link channel. After the error correction processing, link modem 380 reviews the link frame address field 344 to determine whether or not the frame was intended for the station with which the modem is associated. If the frame is for that station, its contents, the station packet 300, are forwarded to the processor 382. If the link frame 328 was intended for other stations 30, the frame is discarded.

The microprocessor 382, such as a Motorola MC68302 processor, controls the overall operation of the station 30 including the broadcast of paging signals thereby. The microprocessor 382 exchanges signals with the link modem 380 in serial form over an HDLC bus 384. Communications over bus 384 are in the same HDLC frame 80 format previously described with respect to the hub 28 (FIG. 5). Microprocessor 382 selectively polls link modem 380 to determine if the modem has information that should be forwarded to the microprocessor. Depending on the results of the polling, microprocessor 382 directs the link modem 380 to transmit the information or data. Associated with the processor 382 are a number of memories, represented by memory block 386, where the operation instructions for the station 30, as well as the signals to be broadcast by the station, are stored. Signals are exchanged between the processor 382 and the memory 386 and between the processor and other elements of the station controller 32 over data, address, and control buses, which are collectively identified as processor bus 388.

The station controller 32 includes a clock 390. The clock 390 has a 32-bit counter 392, which produces a clock time signal that is distributed over a clock bus 394. Counter 392 is driven by the output signal of a VCO 396 that is set to produce a signal centered at 10 MHz. The output signal from the VCO 396 is applied to the counter through a serial clocking bus 398. The clocking bus 398 has branches that extend to counter-comparators that will be described hereafter. The carrier signal produced by some transmitters 34 is established by the transmitter based on the frequency of a reference signal. In a station 30 employing this type of transmitter 34, the output signal from the VCO 396 may be supplied to the transmitter over a branch of clocking bus 398 to serve as the reference signal. The frequency of the signal produced by the VCO 396 is controlled by a digital-to-analog converter (DAC) 400. The DAC converts digital control signals produced by the station processor 382 into an analog control signal that is applied to the VCO 396. The operation of the clock 390 and how its operation is synchronized with the other clocks of this system 20 are discussed hereinafter.

Figure 15:
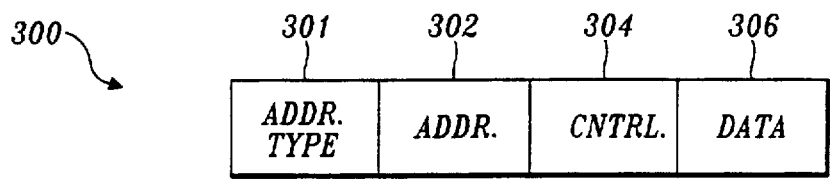
FIG. 15 depicts the structure of a station packet.

The processing of station packets 300 by the station processor 382 begins with a review of the address type field 301 and address field 302 in the packet 300 (FIG. 15). Based on the contents of these fields, the station processor 382 either accepts the packet 300 as one intended for the processor or discards it on the grounds that it is intended for another station. The station processor 382 then reviews the control field 304 to determine if the following data field 306 contains either processor instructions from the hub 28, a control-type PDB 36a, or a data-type PDB 36b. If the data field 306 contains instructions from the hub 28, the station processor 382 executes and/or stores those instructions as may be appropriate.

Figure 7:
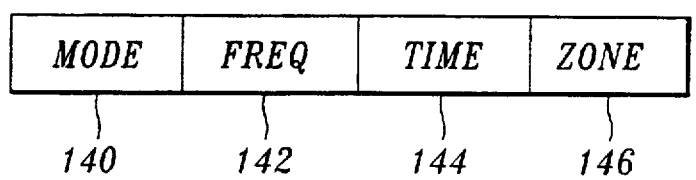
FIG. 7 illustrates a control-type paging data block.

If the station packet 300 contains a control-type PDB 36a, the processor issues the appropriate commands to the transmitter 34. Specifically, if the zone field in the PDB 36a indicates that the PDB is fir the LAG(s) 38, wherein that station is located, or for that particular station, it will issue a command to key the transmitter. If, however, the control-type PDB 36a is directed to a LAG 37 or stations 30 other than that station, processor 382 will automatically recognize it as an instruction to unkey, or deactivate, the transmitter 34 to reduce wear on the transmitter and power consumption. The station processor 382 will also establish the carrier frequency of the transmitter 34 based on the data in the PDB frequency field 142. The modulation, digital, analog, ERMES, or unkeying of the transmitter will be established by the processor 382 based on the data in the mode field. All of this processing occurs at the time specified in the time field 144 (FIG. 7).

If the station packet contains a data-type PDB 36b, the station processor 380 forwards the data to the transmitter at the time and rate specified in the PDB. If the station receives redundant data-type PDBs 36b, either owing to duplicate PDBs from the same link channel, or due to the receipt of identical PDBs from separate link channels, only the first, least-flawed PDB is processed. The later received PDBs 36b are discarded.

If the PDBs 36b contain digital signals for broadcast, sub blocks of signals to be broadcast consecutively are sent to one of two FIFO buffers 402 for temporary storage. It should be understood that each digital paging signal may actually be in the form of a multibit signal. The exact nature of a particular signal is a function of the number of bits needed to form the paging signals that are broadcast by the transmitter 34. For example, if a particular broadcast signal is a two-level frequency-shift signal, only a single bit is applied to the transmitter exciter, not shown, in order to cause the desired frequency shift. However, if the broadcast paging signal is a 16-level frequency-shift signal, four bits are applied to the transmitter exciter to cause the desired frequency shift. In order to accommodate the multi-bit paging signals, the FIFO buffers 402 are multibit buffers. The paging signals are loaded into the FIFO buffers 402 so that each set of bits that form a single paging signal occupies a single byte in the buffer in which it is stored.

The time and rate at which the paging signals are applied to the transmitter 34 are based upon the start time and rate information contained in the PDB 36b. Separate counter-comparators 410 associated with each FIFO buffer 402 generate enabling signals that control when the stored signals are downloaded from each buffer 402. The rate at which the paging signal-equivalent bit(s) are downloaded from the selected buffer 402 is controlled by the clocking signals generated by a baud rate generator 411. The rate at which the baud rate generator 411 generates clocking signals is established by control signals generated by the microprocessor 382. The frequency of clocking signals is proportional to the rate at which the paging signals are to be broadcast and the rate at which the individual bit-sized signals are generated by the originating paging terminal. For example, paging terminal 24 may generate four-level frequency-shift paging signals to be broadcast at 600 signals/sec. The paging terminal 24 will generate the individual bits forming the paging the signal at 1200 baud. Once in a station controller FIFO buffer 402, the bits forming the paging signal will be clocked out of the buffer, two at a time, at a rate of 600 per second. Thus, the paging signals will be applied to the transmitter 34 at the rate at which they are to be broadcast.

The paging signals are downloaded from the FIFO buffer 402 in which they were stored to the transmitter 34 through a 2:1 multiplexer 408. Multiplexer 408, based on state setting commands from the microprocessor, selectively applies the paging signals generated from one or the other of the FIFO buffers 408 to the transmitter 34. The paging signals are applied from the FIFO buffers 408 to the multiplexer 408, and from the multiplexer to the transmitter 34 over a set of parallel buses. While a first set of paging signals in one FIFO buffer 408 is downloaded to the transmitter 34, the microprocessor loads a second set of signal equivalent bit(s) into the other buffer 408. A complementary start time is loaded in the counter-comparator 410 associated with the second FIFO buffer 408. When the downloading of signals from the first FIFO buffer 408 is completed, the downloading of paging signals from the second FIFO buffer 408 will start without a break therebetween.

If the data-type PDB 36b contains digitized analog pages, the paging signals are sent to a DSP 412. The DSP 412 expands the signals so that they are regenerated as a serial digital data stream. The time at which the DSP 412 starts to transmit any particular set of decompressed paging signals is controlled by a counter-comparator 414. Counter-comparator 414 maintains a start time value and a current time value. The current time value is based on clocking signals received over the clocking bus 398. The counter-comparator 414 receives the start time value from the station processor 382 based on the start time and rate information contained in the PDBs 36b. The rate at which the serial data stream is transmitted from the DSP 412 is controlled by clocking signals generated by the baud rate generator 410. The serial data stream is transmitted to a digital-to-analog converter (DAC) 415. The DAC 415 converts the signals into analog form and applies them to the transmitter 34. In many preferred FM-type transmitters 34, the paging signal is applied directly to the reactance circuit of the transmitter to cause the frequency shift of the carrier signal.

IV. System Clocks

In order for the system 20 to operate, the clocks at the hub 28 and at the stations 30 must all, at the same moment, indicate the same time. Otherwise, the individual stations 30 will broadcast pages at different times and pagers 29 in areas with overlapping coverage will receive an unprocessable composite signal. U.S. patent application Ser. No. 07/861,248, filed Mar. 31, 1992, entitled "Clock Synchronization System," owned by the assignee of this application and incorporated by reference herein, discloses one system for ensuring that a number of widely spaced clocks run in agreement.

In brief, though, it should be understood that the oscillator and clock board 68 at the hub 28 (FIG. 4) include the same basic components as are included in the clocks 390 (FIG. 6) at the stations; a counter that maintains a time value based on a clocking signal; a VCO that supplies the clocking signal to the counter; and a digital-to-analog converter that produces a variable voltage signal for controlling the VCO based on control signals from the hub central processing unit (components not shown). The counters 107 on the PTIs 62 maintain the clock time for the PTIs with which they are associated. The PTI counters 107 are incremented by the clocking signal from the clock/oscillator board 68, which is received through the clocking bus 67 and the clocking signal lines 108. The PTI counters 107 are periodically reset, resynchronized with the other clocks in the system based on time signals sent from the clock-/oscillator board through the clocking bus 67 and the strobe lines 109.

The counter 392 of each station clock 390 (FIG. 19) maintains a master clock time for that station 30. Since the counter/comparators 410 and 414 associated with the FIFO buffers, 404 and DSP 412, respectively, are advanced by the same clocking signal applied to the primary counter 392, the counter, the time maintained by these units, advances at the same rate. As part of the station clock synchronization process, after the station clock 390 is synchronized with the other clocks in the system 20, counter/comparators 410 and 414 are synchronized with clock 392 through the transmission of time signals over the clock bus 390.

V. The CURE

The CUREs 50, one depicted in FIG. 20, serve as the inter-segment interfaces of a link channel. A CURE 50 may be located between two sections of a heterogeneous link, for example, where a satellite segment of a link channel interfaces with a microwave segment of the channel. A CURE 50 may also be positioned between the different segments of a homogeneous link channel. For instance, a CURE 50 may be located between two segments of a dedicated radio-frequency link channel.

Each CURE 50 contains a link modem 420 and a processor 422. Communication between the modem 420 and the microprocessor is in the previously described HDLC format discussed with respect to FIG. 5. The CURE 50 also has a GPIO 424 through which the CURE processor 422 exchanges system status information and commands with the hub 28 over the TNPP link 52. The link modem 420 is similar to the hub link modem 64 (FIG. 16) and serves as the interface through which signals are exchanged over the different segments of the link channel. One set of ports of the link modem 420 (ports not shown) is used to exchange signals through one segment of the channels, and the other ports are used to exchange signals through the other segment. Link modem 420 receives incoming link frames 328 and subjects them to error correction processing to remove any errors owing to their transmission over the first segment of the link channel. The link modem 420 then strips the station packets 300 from the link frames 328 and forwards the packet to the CURE processor 422. The CURE processor 422 reads the information contained in the address field information in the packet address type field 301 and in the packet address field 302 to evaluate whether or not the packet is for that CURE 50 and/or the down-line CUREs 50 and stations 30 with which it is associated. If the information in the address field indicates that the packet 300 is for a downline station, the CURE processor 422 returns the packet to the link modem 420 for retransmission on the down-stream segment of the link channel. If the information in the address field indicates that the packet 300 is for that CURE 50, as may be the case if it includes CURE processor instructions, the processor 422 executes and/or stores those instructions as may be appropriate. Some packets may contain instructions for all CUREs 50 or all receiving units associated with the link channel. In this case each CURE processor 422 will execute/store the instructions and also retransmit the instructions on the downstream link segment.

The CURE processor 422, in addition to controlling the processing of incoming station packets 300, controls the overall operation of the CURE 50. The processor 422 monitors the status of both the link modem 422 and the link channel segments associated with the CURE 50. Any faults detected by the processor 422 are reported to the hub 28 through either the link channel or over the TNPP link 52. For example, as part of the error correction process, the link modem 420 reports the percent of error-free link frames it can forward onto the downstream segment of the link channel. If the percent of error-free link frames falls below a given level, the CURE processor 422 generates an appropriate warning notice that is forwarded to the hub 28. The CURE processor 422 also responds to commands generated by the hub 28. For example, in response to commands from the hub 28, the CURE processor 422 may disassemble one link segment, such as a satellite link, and establish a substitute segment, such as through the PSTN 26.

VI. The MOP

FIG. 21 depicts one of the MOPs 40 that monitor the operation of the stations 30. The MOP 40 includes a paging channel receiver 428 that is configured to receive the signals broadcast by the stations 30 with which the MOP is associated. These signals include pages, and, as discussed in the Clock Synchronization System application, could include time marks. The signals are forwarded to a receiver interface 430, a modem that places them in a digital signal format. The digitized signals are forwarded to a MOP processor 432. The MOP processor 432 analyzes the signals in order to evaluate the performance of the stations 30 with which it is associated.

To facilitate the synchronization of the clocks 390 of the stations 30 with which the MOP 40 is associated, the MOP is provided with a clock 434. The clock 434 is synchronized with the other clocks in the system 20. The MOP processor 432 synchronizes associated station clocks 390 by computing the difference between the time in a time mark message from the station with the time measured by the MOP clock 434. The difference value is forwarded back to the hub 28 in a message that identifies the station for which the comparison was made. Based on that difference value, the hub 28 directs the station 30 to reset the station clock 390 as may be appropriate.

Some MOPs 40 are provided with link modems 436 and associated link channel transceiver equipment in order to exchange system status information and commands with the hub 28 over one or more link channels. Alternatively, these signals can be exchanged over the TNPP link 52, in which case the hub is provided with a GPIO board 438.

VII. System Operation

When the simulcast system 20 of this invention is in operation, the paging terminals 22 and 24 forward paging signals to the hub 28. More specifically, the pages are forwarded to the specific hub $PTI_{1, 2, 3, or 4}$ 62 associated with the WAG 37 for which the pages are intended. Based on the control information sent with the pages by the paging terminal 22 or 24, the PTI 62 initially creates a control-type PDB 36a that designates which stations in the WAG 37 should broadcast the pages, the frequency at which they should be broadcast, and the particular mode in which they should be broadcast. The paging signals themselves are placed in data-type PDBs 36b. Pages in the form of analog signals are digitized and compressed prior to their packetization into PDBs 36b. Low-speed digital paging signals are subjected to a data capture process wherein the baud rate of the signals is determined as part of the process of placing them in the PDB 36b. The PTI 62 places high-speed digital paging signals directly in the PDB 36b. The PTI relies on mode information sent from the paging terminal 22 or 24 in order to establish the baud rate for these signals. Each data-type PDB 36b, in addition to containing paging signals, contains a start time message indicating the time at which the receiving station should start to broadcast the signals and a rate message to indicate the rate at which they should be broadcast. Once the PDB 36b is created, it is forwarded to the hub central processing unit 60 over the HDLC bus 66. In one particular embodiment of this invention, data transfer over the HDLC bus 66 takes place at a rate of 256,000 bits per second. The data transfer at this rate ensures that there is sufficient time for all the communication and PDB transfer to occur between the central processing unit 60 and the PTIs 62 and the LMs 64.

The hub central processing unit 60 directs the PDBs 36 over a specific set of link channels $_{1, 2, 3, 4, 5, or 6}$ based upon which PTI 62 initially generates the PDBs. When the central processing units 60 forward a PDB 36 for retransmission, it places the PDB in a station packet 300 and forwards it to the LM$_{A, B, or C}$ 64 associated with the link channel(s) over which the packet should be transmitted. The station packet 300 indicates specifically which stations 30 should process its contents, and whether or not the particular packet contains soilware instructions for execution by the recipient stations, a control-type PDB 36a, or a data-type PDB 36b. The station packet 300 is transmitted to the appropriate LM(s) 64 inside an HDLC frame 80, which includes a set of instructions that direct the recipient LM(s) to transmit the station packet over the appropriate link channel. At the LM 64, the station packet 300 is placed in a link frame 328 for transmission over the appropriate link channel. If the station packet 300 is the first packet to be transmitted over the link channel, the central processing unit may, prior to the transmission of the packet, direct the LM 64 to key the link channel transceivers. After the transmission of the last station packet 300, the central processing unit 60 may instruct the LM 64 to unkey the link channel transceiving equipment in order to reduce wear on the equipment and link channel power consumption.

The link modems 380 and 422 at the stations 30 and CUREs 50 initially subject the link frames 328 to error correction processing in order to remove any errors that develop as a consequence of the intra-link transmission of the frames. Based on the address information in the link frame 328, the receiving link modems 380 and 422 determine whether or not a particular frame was intended for that station or that link channel. At a station 30, if a link frame 328 was received that was designated for that station, the station packet 300 is then stripped from the frame and forwarded to the station processor 382. If the station packet contains a control-type PDB 36a with a transmit-key command for that station 30, the processor 382 will generate the signals needed to actuate the transmitter 34 as may be appropriate, and also generate the control signals needed to establish the transmitter carrier frequency and transmitting mode. The transmitter will be set to key, will be turned on, at the time specified in the start time field 144 contained in the PDB 36a (FIG. 7). If the station packet 300 includes a data-type PDB 36b, the station controller forwards the embedded paging signals to the transmitter 34. The time and rate at which the signals are forwarded to the transmitter 34 is based upon the start time and rate information contained in the PDB 36b. The transmitter 34, in turn, broadcasts the paging signals for reception and processing by the pager 29 assigned to the subscriber for whom the page is intended.

Each copy of a particular data-type PDB 36b that is sent to a number of stations 30 contains the same start time and rate information. Accordingly, each station 30 broadcasts the pages contained within that PDB 36b starting at the exact same time, and at the exact same rate. A pager 29 located in an overlap zone receiving signals from two or more stations will receive a combined signal that represents the in-phase sum of the signals. Since the signals are not out of phase they can be readily processed by the pager 29.

Figure 12D:
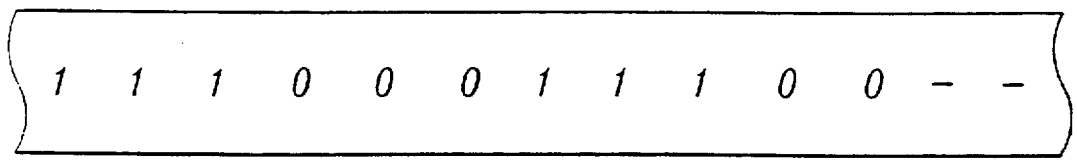

Another advantage of the system 20 of this invention is that it is able to forward to the station 34 for final broadcast pages that may be in a number of different formats: analog, low-speed digital signals, or high-speed digital signals. In other words, one simulcast system 20 of this invention can be used to forward a number of different types of signals that widely vary in format from each other. When a data-type PDB 36b contains digital paging signals that are processed at different baud rates, the signals are broadcast at the corresponding baud rate, the rate indicated in the PDB rate field 152. Pagers 29 designed to receive signals at lower baud rates will recognize the multiple "0s" and "1s" in the data stream from the stations 30 as their single "0s" and "1s" equivalents. For example a pager 29 designed to process incoming signals at 400 baud, will process the "111" signal of FIG. 10C broadcast at 1200 baud as a single "1" signal. A pager 29 designed to process 300-baud signals will recognize the "001100" signal of FIG. 11D at 600 baud as a "010" signal. A pager 29 set to process incoming signals at 1000 baud will recognize the 3000-baud "111000111" signal of FIG. 12D as a "101" signal. The 3000-baud "00" signal of the same FIGURE will be recognized as a "0" signal by a pager 29 set to process 1500-baud signals. Thus, even though a particular data-type PDB 36b may contain signals that were originally generated at different baud rates, since the signals are in a form based on their common denominator, they can all be processed by the pagers 29 associated therewith.

Still another feature of this invention is that the station link modems 380 perform error correction processing on the contents of the link frames for the station packets 340 that are processed. The link frames are similarly subjected to error correction processing by the CUREs 50 when they are transferred between the different segments of a link channel. This minimizes the number of errors that are in the paging signals that are actually forwarded to the transmitters 34 for broadcast.

Depending on the capacity of the link channels, the simulcast system 20 of this invention can forward the signals to be simulcast at rates much faster than the rates at which the signals are broadcast by the station transmitters 34. Accordingly, even though the paging signals are encoded within PDBs 36b, station packets 340, and link frames 368, since the signals are forwarded at relatively high speed to the stations 30, the transmission of the ancillary information contained in these outer packets does not appreciably reduce the link channel transmission time available for forwarding paging signals to the stations 30. In fact, since the signal transmission rate over some link channels is so fast, these channels can be used to forward paging signals to multiple WAGs 37. In this embodiment of the invention, the individual CUREs 50 and stations 30 selectively discard or forward/process the contents of the received link frames 328 based on the contents of the link frame address fields and the station packet address fields. Another advantage of this feature of the invention is that it allows a particular link channel to be used to forward PDBs 36b to one particular WAG 37 while at the same time interleave therewith software commands to the stations located within a second WAG 37.

Alternatively, in the event PDBs 36b cannot be forwarded to a particular set of stations over one link channel fast enough, link spreading can be employed to forward the signals over multiple link channels. The processing equipment internal to the station controllers 32 will then put the paging signals in the correct order to ensure that they are simulcast in the proper sequence. Also, in the event it may be difficult to forward error-free signals to a station 30 over a particular link channel, redundant copies of the PDBs 36 can be forwarded to that station using either a single link channel or different link channels. The station controller can then forward the contents of the most error-free PDB 36 to the transmitter 34 to ensure that the signals that correspond most closely to those originally generated by the paging terminal 22 or 24 are broadcast. Another advantage of this multi-link channel transmission scheme offered by the simulcast system 20 of this invention is that it allows the system to be configured to take advantage of the most economical link channels that are available for forwarding the signals to the stations 30.

The MOPs 40 of this system 20 only periodically monitor the performance of the stations 20 with which they are associated. Each MOP does not have to continuously monitor the performance of the stations with which it is associated in order to ensure that the station is functioning properly. This serves to reduce the overall expense of running the system.

Figure 22:
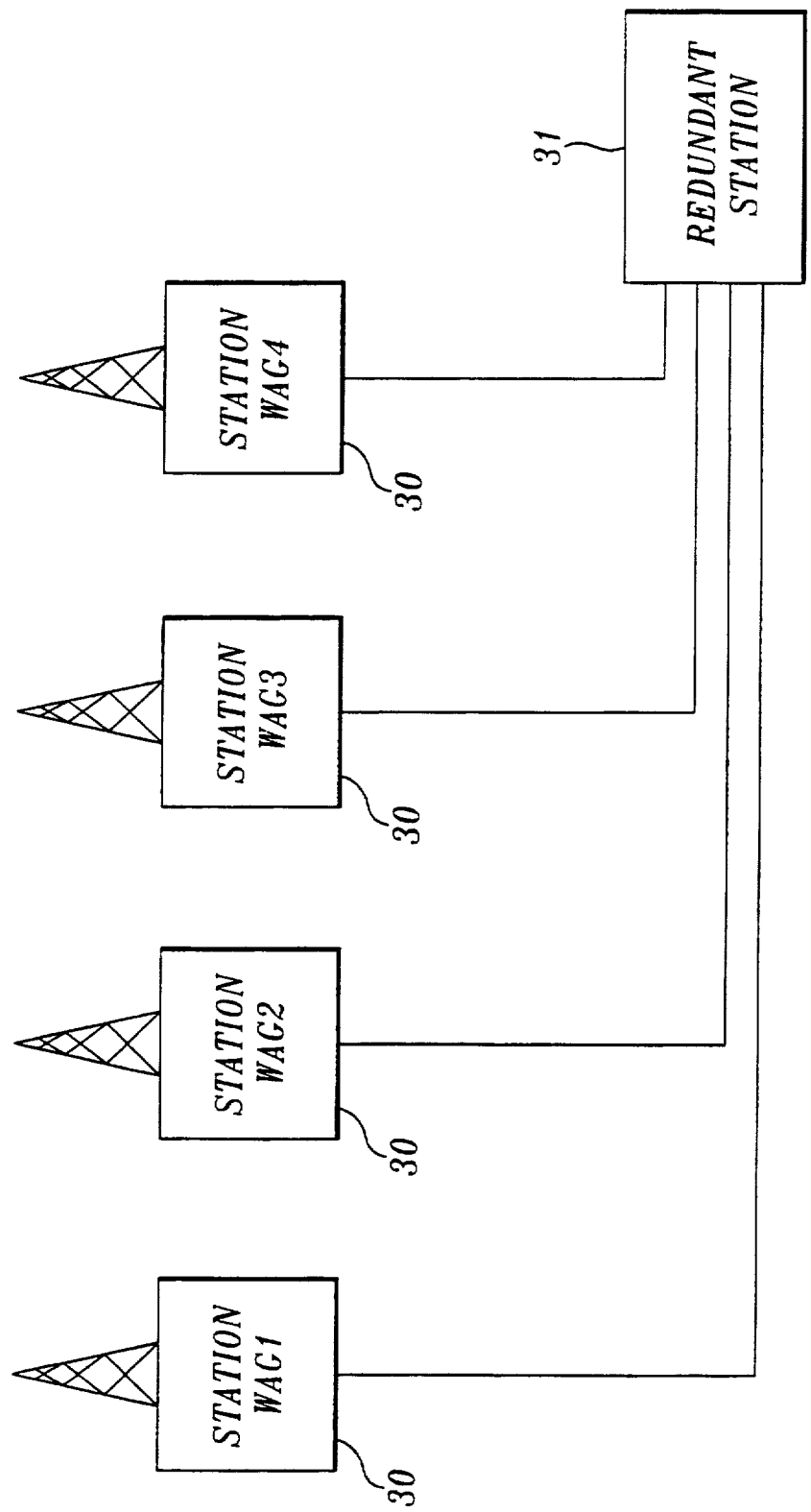
FIG. 22 depicts how a system of this invention designed to simulcast multiple signals in a single geographic area can be provided with a spare, or redundant, transmitting station.

Still another feature of this invention is that for any given set of stations 30 in a single geographic area associated with different WAGs 37, relief services can be provided by a single redundant station 31 as depicted in FIG. 22. As seen in this FIGURE, there are a number of stations 30 within a given geographic area. Each station 30 broadcasts pages over a distinct carrier frequency that is associated with a specific WAG 37. Associated with this set of stations 30 is a single redundant station 31. The station controller 32 in the redundant station 31 is configured to monitor the performance of the operating stations 30 with which it is associated. This monitoring may be in the form of on-the-air periodic sampling of performance of the operating stations 30 or in the form of signal state monitoring of operating information forwarded to the redundant station 31 over any convenient communications network. In the event one of the operating stations 30 fails, the redundant station 31 can inform the hub 28 and connect to a link channel to receive the PDBs 36 intended for the failed operating station. Once these PDBs 36 are received, the redundant station can broadcast their contents to take the place of the failed station 30. Since the one redundant station 31 can provide relief coverage for a number of closely located operating stations, the cost of providing this coverage on a per-operating station basis is kept to a minimum.

Figure 8:
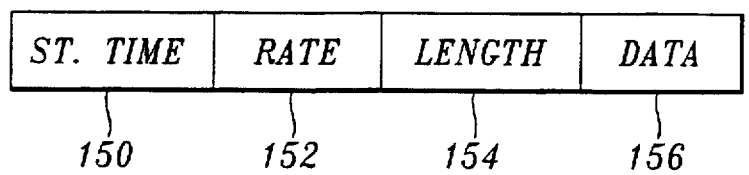
FIG. 8 illustrates a data-type paging data block.
Figure 23:
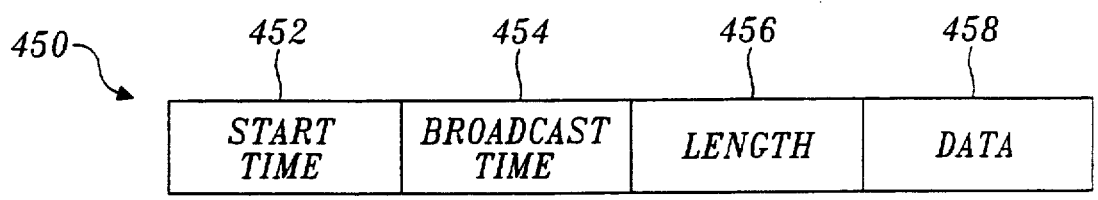
FIG. 23 illustrates an alternative form of a data-type paging block.
Figure 24:
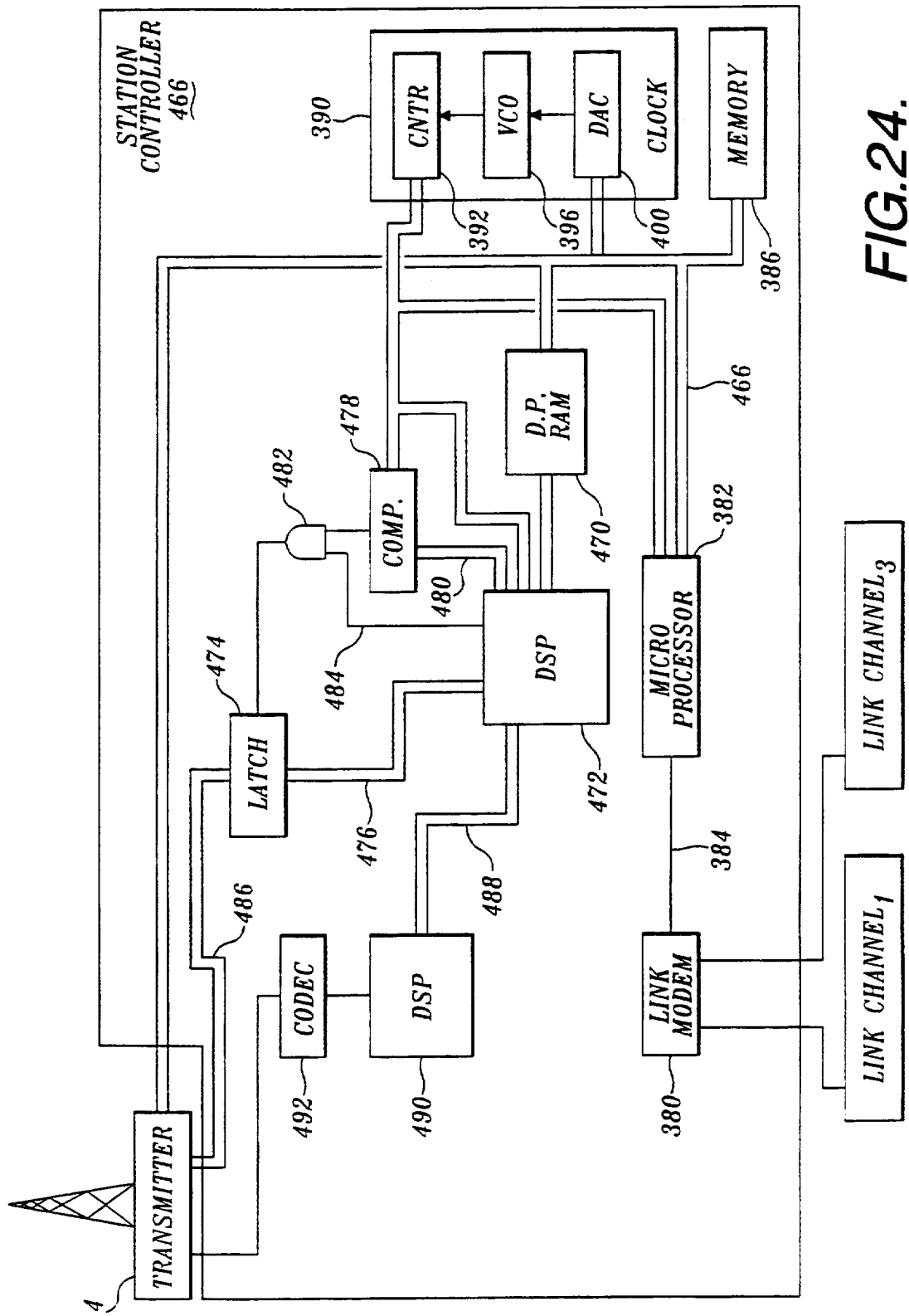
FIG. 24 depicts in block diagram form an alternative transmitting station including the system control that regenerates the signals for broadcast by the station's transmitter.

An alternative technique for forwarding the signals to be regenerated and simulcast at the multiple stations 30 according to the system 20 of this invention is illustrated with respect to FIGS. 23 and 24. FIG. 23 illustrates an alternative data-type PDB 450 that the PTIs 62 (FIG. 6) are capable of generating. Each data-type PDB 450 includes a start time field 452, a broadcast time field 454, a length field 456, and a data field 458. The start time field 452 contains the indication of when the receiving stations 30 should start to broadcast the signals in that PDB 450 and the data field 458 contains the actual digitized signals that are to be broadcast. The length field 456 contains an indication of the number of signals to be broadcast that are contained in the data field 458. The PTI microprocessor 102 generates the start time, the contents of the data field 458, and the contents of the length field 456 according to the methods previously described with respect to data-type PDB 36b (FIG. 8). The broadcast time field 454 contains an indication of the amount of time the individual stations 320 will need to broadcast the signals contained in the PDB 450. The PTI microprocessor 102 calculates the broadcast time by multiplying the signal duration for the signals in the PDB buffer that will be loaded into the PDB 450 by the number of signals that will be loaded into the PDB 450. The determination regarding the number of individual bits that compose a single signal is made by the microprocessor 102 on the basis of mode information supplied by the paging terminal that generated the original paging signals. Alternatively, the broadcast time is computed by subtracting the transition time of the leading edge of the first bit in the PDB from the transition time of the trailing edge of the last bit in the PDB. After a PDB 450 is created, it is forwarded like any other PDB 36 to the hub central processing unit 60, the appropriate LM(s)64, and the appropriate link channel(s) to the designated stations 30.

FIG. 24 illustrates an alternative embodiment of a station 30 that includes an alternative station controller 464 capable of regenerating the signals contained in data-type PDB 450. Station controller 464 includes the same link modem 380, microprocessor 382, memory 386, and clock 390 described with respect to station controller 32 (FIG. 19). Microprocessor 382 exchanges signals with other components of the station controller 464 and with the transmitter 34 over a set of data, address, and control buses, which are collectively identified as processor bus 466. The clock counter 392 broadcasts clock time signals to other components of the station 30 over a clock bus 468. The counter value, the clock time, may also be reset by signals that are forwarded to the counter 392 from the microprocessor over the clock bus 468.

If an incoming station packet 300 contains a control-type PDB 36a, microprocessor 382 processes their contents according to the previously described steps If the station packet 300 contains data-type PDBs 450, the entire contents of the block are sent to a dual-port RAM 470 for temporary storage. The contents of the PDB 450 are forwarded from RAM 470 to a digital signal processor 472 when the processor 472 is available to regenerate the signals contained therein. If the stations transmit digital format signals, the digital signal processor 472 loads the signals on a signal-by-signal basis into a latch 474. The loading of signals into the latch 474 on a signal-by-signal basis is understood to mean that the number of regenerated bits loaded into the latch is a function of the number of bits needed to form one signal out of the transmitter 34. The signals are transferred from the digital signal processor to the latch 474 over a parallel bus 476.

Simultaneously with the loading of the signal-equivalent bit(s) into the latch 474, the digital signal processor 474 loads a signal broadcast time into a comparator 478. The digital signal processor calculates the start time for each signal based on the following formula:

$$S.T._N = N \frac{B.T.}{\Sigma N} + S.T._{PDB} \quad (3)$$

wherein: $S.T._N$ is the start time for the Nth signal in the PDB; B.T. is the total broadcast time for all the signals in the PDB; $\Sigma N$ is the total number of signals contained in the PDB; and $S.T._{PDB}$ is the start time for the signals contained in the PDB 450. The signal start time is applied to the comparator 478 over a parallel start time bus 480. The current time is supplied to the comparator from the clock 390 over a branch of the clock bus 468. Whenever the current time and start time are equal, comparator 478 asserts a transmit signal that is applied to the latch 474 through an AND gate 482. The other input into the AND gate 482 is a transmit enable signal that is selectively generated by the digital signal processor 472. The transmit enable signal is generated by the digital signal processor 472 when the processor 472 is regenerating signals contained in the PDBs 450. The AND gate 482 in conjunction with the selectively generated transmit enable signal ensures that transmit signals are forwarded to the latch 474 only when the latch has signals to forward to the transmitter 34. Upon receipt of a transmit signal, the paging signals stored in the latch 474 are forwarded to the transmitter 34 over a parallel transmit signal bus 486.

If the PDB 450 contains digitized analog paging signals, the digitized signals are forwarded to a second digital signal processor over a serial bus 488. The time at which the signals are forwarded to the second digital signal processor is regulated by the system time as measured by the clock 390. A branch of the clock bus 468 supplies the system time to the first digital signal processor 472. The second digital signal processor decompresses the paging signs in the PDB 450 and applies them over a serial line to a CODEC 492. CODEC 492 converts the digital signals into an analog format. The analog signals generated by the CODEC 492 are applied to tile transmitter 34 for broadcast.

An advantage of the data forwarding signal regeneration process of this embodiment of the invention is that regeneration is based solely on the duration of the signals to be simulcast. This eliminates the need to base the regeneration of the signals on the control signals produced by another component, a baud rate generator, and the inherent error added by basing the regeneration of the signals on a second signal. Still another advantage of this embodiment of the invention is that the regeneration is based on the total duration time for all the signals contained in the PDB 450, not just the duration of a signal. This eliminates the error that could otherwise occur if the individual signal duration time is slightly inaccurate. This error, which for an individual signal may be of little consequence, can amount to a significant error over the time period in which the signals in a PDB are transmitted. In this embodiment of the invention signal regeneration is based on the same equation that employs the same variables at the same time. Therefore, the different regenerations of the same signal take place at the exact same instant.

The foregoing description is limited to particular embodiments of this invention. It will be apparent, however, that variations and modifications can be made to this invention with the attainment of some or all of the advantages thereof. In some versions of the invention, it may be desirable to provide the data-type PDBs with bit duration information as opposed to baud rate information. Also, in some versions of the invention, all control information may be contained in an initial, control-type PDB 36 and the data-type PDBs 36 only containing a sequence identifier followed by paging signals that need to be reformatted for simulcasting. Furthermore, there is no requirement that the components of the system 20 of this invention be identical to or operate the same as the components disclosed above. In some versions of the invention, multiple paging terminals 22 and 24 may, for instance, generate pages that are to be broadcast over stations 30 associated with a single WAG 37. In these versions of the invention, the start time for the pages may not be generated by the PTIs 62 associated with the individual stations but may be generated by the hub central processing unit 60 based on a periodic analysis of all the PDBs that are queued for release to the stations 30. In a similar vein, each PTI 62 may generate PDBs 36 that are to be forwarded to the stations over different sets of link channels. In these versions of the invention, PDBs will have associated with them some indicia of the link channels over which they are to be forwarded, and the central processing unit will, based on these flags, forward them to the link modems 64 associated with the designated channels. Also, alternative hardware constructions of this system 20 may be provided without departing from the scope of the invention. For example, in some versions of the invention the hub 28 may be constructed so that direct PTI-to-LM PDB transfer may take place over some type of switching network that is controlled by the central processing unit 60. Also, in alternative embodiments of the invention, new data-type PDBs 36b may be created when the difference in bit duration is different from the 1/32 or 32 times as described. For instance, in some versions of the invention, the PTIs 62 may automatically create new data-type PDBs 36b whenever the difference in bit durations between a newly received bit and the NTL bit is less than one-fourth or greater than four. There may also be instances when it is desirable to program one or more stations 30 in the system 20 so that they broadcast signals at a time slightly ahead of or slightly behind the start times contained in the start time fields of the received PDBs. This offset may be employed when the overlap zone between adjacent stations is offset from the geographic zone that is midway between the two stations. In this situation, owing to the differences in propagation time, the two signals may reach the overlap zone at different times and be out of phase with each other. The introduction of a delay/advance broadcast time offset for the signals broadcast by one of the stations 30 can compensate for differences in propagation time and ensure that the signals will be in phase when they reach the overlap zone.

It should be similarly understood that the packages in which the signals are forwarded may vary significantly from what has been described. For example, in some versions of the invention it may not be necessary for PDBs 36 to be in station packets 340. In these versions of the invention, all, some, or even none of the control information contained in the station packet may be included in the PDB itself or in the link frame with which it is associated. It should also be understood that the structure of the stations may vary significantly from what has been described. Some stations may, for example, not require the ancillary counter-comparators 410 and 414 and instead may rely on trigger signals generated by the station clock 390 itself. Furthermore, data capture techniques other than those that have been described may be used. Also, as discussed with respect to station 30a (FIG. 2) each station may have more than one transmitter 34. In this embodiment of the invention the station controller 32 is configured to forward pages, and the instructions for broadcasting same, to the individual transmitters 34 in such a manner that the transmitters are able to broadcast signals simultaneously. Also, it should be understood that, in some versions of the invention, the redundant station 31 may always receive the PDBs 36 for the stations with which it is associated. Then, whenever one of the stations 30 fails, the redundant station 31, without waiting for instructions from the hub 28, will start to broadcast the signals that would otherwise have been broadcast by the failed station. An advantage of this configuration of the system 20 is that it ensures there will be only a minimal interruption in simulcast broadcast between the time the failed station stops broadcasting and the redundant station 31 takes its place. Therefore, it is the object of the appended claims to cover all such variations that come within the true spirit and scope of the invention.

The embodiments of the invention in which an exclusive property or privilege is claimed are defined as follows:

1. A simulcast broadcast system comprising:
a hub including:
  a clock for maintaining a system time;
  an interface unit for receiving signals to be broadcast and connected to said clock for receiving said system time, said interface unit functioning to: determine the rate at which the signals are to be broadcast; packetize the signals into a plurality of signal blocks wherein signals in said signal blocks are in a digital format; and provide each said signal block with a start time based on said system time and a rate signal representing a desired broadcast rate liar the signals;
  a linking unit connected to said interface unit for receiving said signal block and for forwarding said signal block over a link channel; and
a plurality of stations, each said station including:
  a transmitter for broadcasting said signals to be broadcast;
  a linking unit connected to the link channel for receiving said signal blocks;
  a clock for maintaining said system time; and
  a station processor that is connected to said station clock for receiving said system time, that is connected to said linking unit for receiving said signal blocks, and that is connected to said transmitter for forwarding the signals to be simulcast thereto, said station processor functioning to forward said signals to be broadcast in each said signal block to said transmitter when said system time equals said start time in said signal block to be broadcast at a rate based on said rate signal in said signal block.

2. The simulcast broadcast system of claim 1, wherein the signals for broadcasting include digital signals having variable broadcast rates, and each digital signal has a bit duration proportional to the broadcast rate of the signal;
said interface unit in said hub determines the rate of the digital signals to be broadcast based on the bit durations of the signals, and forwards set signal blocks to said linking unit in said hub at a rate faster than the broadcast rate of the signals to be broadcast; and said linking unit in said hub forwards said signal blocks over the link channel to said stations at a rate different from the broadcast rate of the signals to be broadcast.

3. The simulcast broadcast system of claim 2, wherein said interface unit in said hub places digital signals to be broadcast at different broadcast rates in a single said signal block by converting the digital signals to be broadcast at a first broadcast rate to equivalent signals based on the broadcast of the signals at a second broadcast rate and bases said signal block rate signal on said second broadcast rate.

4. The simulcast broadcast system of claim 1, wherein the signals for broadcasting include digital signals having variable broadcast rates and each digital signal has a bit duration proportional to the broadcast rate of the signal;
said interface unit in said hub determines the rate of the digital signals to be broadcast based on signal status signals received by said interface unit with the digital signals to be broadcast, and forwards said signal blocks to said linking unit in said hub at a rate faster than the broadcast rate of the signals to be broadcast; and
said linking unit in said hub forwards said signal blocks over the link channel to said stations at a rate different from the broadcast rate of the signals to be broadcast.

5. The simulcast broadcast system of claim 3, wherein said interface unit in said hub determines the broadcast rate of low-speed digital signals to be broadcast based on the bit duration of the signals and determines the broadcast rate of the high-speed digital signals to be broadcast based on signal status signals received by said interface unit with the digital signals to be broadcast.

6. The simulcast broadcast system of claim 3, wherein said interface unit in said hub determines the broadcast rate of digital signals to be broadcast at baud rates equal to or less than a predetermined value based on the bit durations of the signals and determines the broadcast rate of digital signals greater than said predetermined value based on signal status signals received by said interface unit with the digital signals to be broadcast.

7. The simulcast broadcast system of claim 1, wherein the signals for broadcasting include analog signals and digital signals;
said interface unit in said hub functions to: convert the received analog signals into digitized signals having a selected broadcast rate; place the digitized analog signals into said signal blocks; base said signal block rate signals for said digitized analog signals on said selected broadcast rate; and forward said signal blocks to said linking unit in said hub at a rate faster than said broadcast rate of said signal blocks;
said linking unit in said hub forwards said signal blocks over the link channel to said stations at a rate different than the broadcast rate of the signals; and said station processors in said stations each further include a digital-to-analog converter circuit for receiving said digitized analog signals to convert said signals into analog signals for forwarding to said transmitters and said stations.

8. The simulcast broadcast system of claim 5, wherein the signals for broadcasting include analog signals;

said interface unit in said hub functions to determine the form of the signals to be broadcast based on signal status signals received with the signals to be broadcast, and if the signals to be broadcast are in analog form further functions to: convert the analog signals to be broadcast into digitized signals having a selected broadcast rate; place the digitized analog signals into said signal blocks; base said signal block rate signals for said signal blocks with said digitized analog signals on said broadcast rate of said digitized analog signals; and forward said signal blocks to said linking unit in said hub at a rate faster than the broadcast rate of these signals;

said linking unit in said hub forwards said signal blocks over the link channel to set stations at a rate different than the broadcast rate of the signals to be broadcast; and said station processors in said stations each further include a digital-to-analog converter circuit for receiving said digitized analog signals and converting said signals into analog signals for forwarding to said transmitters and said stations.

9. The simulcast broadcast system of claim 1, wherein:

said signal blocks are forwarded from said hub to said stations over a plurality of link channels; and said hub further includes:

a plurality of linking units wherein said linking unit are configured to forward said signal blocks to said stations over different link channels; and a central processing unit connected to said interface unit in said hub and said linking units in said hub for controlling the transfer of said signal blocks from said interface unit to said linking units.

10. The simulcast broadcast system of claim 9, wherein said central processing unit in said hub is connected to said interface unit in said hub for receiving said signal blocks therefrom and is connected to said linking units in said hub for selectively sending said signal blocks thereto.

11. The simulcast broadcast system of claim 9, wherein one of said plurality of linking units in at least one of said plurality of stations is configured to receive said signal blocks over two separate link channels.

12. The simulcast broadcast system of claim 11, wherein said central processing unit controls signal block transfer to said at least one station configure to receive said signal blocks over two said link channels so that said signal blocks forwarded to said station have different said start times in said signal blocks.

13. The simulcast broadcast system of claim 1, wherein said hub is configured to forward redundant copies of a signal block to at least one of said plurality of stations and said signal processor in said at least one station forwards to said transmitter associated therewith only the signals to be broadcast that are contained in one copy of said redundant signal block.

14. The simulcast broadcast system of claim 11, wherein said hub is configured to forward redundant copies of a signal block over two separate link channels to said at least one station configured to receive signal blocks over two said channels and said signal processor at said at least one station only forwards to said transmitter associated therewith the signals to be broadcast that are contained in one copy of said redundant signal block.

15. The simulcast broadcast system of claim 9, wherein said hub further includes:

a plurality of interface units for receiving signals to be broadcast that function to generate said signal blocks; and said central processing unit in said hub is connected to said interface units and said linking units for controlling the transfer of said signal blocks to said interface units, wherein said central processing unit forwards said signal blocks to said linking units based on which said interface unit in said hub generated said signal blocks.

16. The simulcast broadcast system of claim 13, wherein:

said linking units in said hub encode said signal blocks in link frames for transmission of the link channels and said link units include in said link frames error correction data;

said linking units in said stations are configured to received said link frames, perform error correction processing on said link frames based on said error correction data included therewith, and remove said signal blocks from said error corrected link frames; and said station processor at said at least one station configured to receive redundant copies of said signal block forwards to said station transmitter associated therewith the signals to be broadcast contained in the copy of said signal block with the least errors.

17. The simulcast broadcast system of claim 1, wherein:

said interface unit in said hub provides each said signal block with said rate signal in the form of a broadcast time signal indicative of the time needed to broadcast said signals in said signal block and a packet length signal indicative of the number of said signals in said signal block; and said station processors in said stations determine said rate at which said signals in said signal blocks are to be broadcast based on said broadcast time in said signal blocks and said packet length signals in said signal blocks.

18. The simulcast broadcast system of claim 3, wherein:

said interface unit in said hub provides each said signal block with said rate signal in the form of a broadcast time signal indicative of the time needed to broadcast said signals in said signal block and a packet length signal indicative of the number of said signals in said signal block; and said station processors in said stations determine said rate at which said signals in said signal blocks are to be broadcast based on said broadcast time in said signal blocks and said packet length signals in said signal blocks.

19. The simulcast broadcast system of claim 1, further including:

a maintenance operating point including: a receiver adapted to receive signals broadcast by at least one of said plurality of stations; a clock for maintaining said system time; a processor connected to said receiver for receiving said signals that are broadcast, said processor functioning to generate status reports based on said signals that are broadcast; and a communications unit connected to said processor for receiving said status reports; and a communications link different from the link channel connected at a first end to said communications unit in said maintenance operating point and at a second end to said hub wherein said status reports generated by said processor in said maintenance unit operating point are forwarded to said hub over said communications link; and wherein said hub further includes a communications unit connected to said second end of said communications link for receiving said status reports generated by said processor in said maintenance operating point, and a central processing unit that is connected to said communications unit in said hub for receiving said status reports generated by said processor in said maintenance operating point, said central processing unit in said hub functioning to generate station commands based on said status reports, and wherein said linking unit in said hub is connected to said central processing unit in said hub for receiving said station commands and forwarding said station commands over the link channel; and said processors in said stations are further connected to receive said station commands generated by said central processing unit in said hub from said linking units in said stations, and said processors in said stations functioning to control said stations based on said received station commands generated by said central processing unit in said hub.

20. The system of claim 19, wherein:
said at least one said station associated with said maintenance operating point broadcasts signals, including said system clock time based on said clock in said station, to said maintenance operating point;
said processor in said maintenance operating point functions to compare said system time from said station with said system time maintained by said clock in said maintenance operating point and in response to said comparison generates a station clock status report;
said central processing unit in said hub further functions to generate a station clock reset command based on said station clock status report generated by said processor in said maintenance operating point; and
said processor in said at least one station is further connected to said clock in said station for adjusting said clock and said processor in said station further functions to adjust said clock in said station in response to receiving a station clock reset command generated by said central processing unit in said hub.

21. The simulcast broadcast system of claim 1, wherein said interface unit in said hub bases said start times in said signal blocks on said system time when said initial signal in each said signal block is received.

22. A paging system for simulcasting pages, said paging system configured for connection to a publicly switched telephone network, said paging system comprising:
a paging terminal connected to the publicly switched telephone network for receiving calls for system subscribers, said paging terminal functioning to generate pages in response to calls for system subscribers;

a hub including:
  a clock for maintaining a system time;
  an interface unit connected to said paging terminals for receiving said pages and connected to said clock for receiving said system time, said interface unit functioning to: determine the rate at which said pages are to be broadcast; packetize the signals into a plurality of paging data blocks wherein said pages in said paging data blocks are in a digital format; and provide each said paging data block with a start time based on said system time and a rate signal representing a desired broadcast rate for the pages;
  a central processing unit connected to said interface unit for receiving said paging data blocks, said central processing unit functioning to place said paging data blocks in station packets;
  a linking unit connected to said central processing unit for receiving said station packets and for forwarding said station packets over a link channel; and a plurality of stations, each said station including:
  a transmitter for broadcasting said pages to be broadcast;
  a linking unit connected to the link channel for receiving said station packets;
  a clock for maintaining said system time; and
  a station processor that is connected to said station clock for receiving said system time, that is connected to said linking unit for receiving said stations packets, and that is connected to said transmitter for forwarding said pages to be simulcast thereto, said station processor functioning to remove said paging data blocks from said packets in which said paging data blocks are contained and forward said pages to be broadcast in each said paging data block to said transmitter when said system time equals said start time in said paging data block to be broadcast at a rate based on said rate signal in said paging data block.

23. The paging system of claim 22, wherein:
said central processing unit in said hub provides each said station packet with a station address; and
said stations are arranged in groups, each said group of stations having a particular station address associated therewith and said processors in said stations each further function to remove said paging data blocks from said station packets and to forward said pages in said paging data blocks to said transmitters only when said station addresses in said station packets match said particular station address of said group of stations with which said processor is associated.

24. The paging system of claim 23, wherein:
said hub includes a plurality of interface units for receiving pages from said paging terminal; and said central processing unit in said hub is further connected to each said interface unit for receiving paging data blocks therefrom, and said central processing unit in said hub further functions to provide said station packets containing said paging data blocks with station addresses based on which said interface unit in said hub forwarded said paging data block to said central processing unit in said hub.

25. The paging system of claim 23, further including:

a plurality of paging terminals connected to the publicly switched telephone network for generating pages; and wherein:

said hub includes a plurality of interface units, each of said plurality of interface units being connected to different ones of said plurality of paging terminals for receiving pages therefrom, and said central processing unit in said hub further functions to provide said station packets containing said paging data blocks with station addresses based on which said interface unit in said hub forwarded said paging data blocks to said central processing unit.

26. The paging system of claim 23, wherein said interface units in said hub base said start times in said paging data blocks on said system time when said initial page in each said paging data block is received from said paging terminal.

27. The paging system of claim 26, wherein:

said paging terminal generates analog pages and digital pages;

said interface units in said hub further function to: convert the analog pages into digitized form at a selected broadcast rate; place the digitized analog pages into said paging data blocks; base said rate signals for said paging data blocks on said selected broadcast rate; and forward said paging data blocks to said linking unit in said hub at a rate faster than the broadcast rate of the signals to be broadcast;

said linking unit in said hub forwards said signal blocks over the link channel to said stations at a rate different from the broadcast rate of the signals to be broadcast; and each said station processor further includes a digital-to-analog converter circuit for receiving said digitized analog signals and converting said signals into analog signals for forwarding to said station transmitter.

28. The paging system of claim 27, wherein:

said paging terminal generates said digital pages at variable rates for broadcast by said transmitters in said stations wherein said digital pages include low-speed digital pages and high-speed digital pages and said digital pages have a bit duration associated therewith, said bit duration being proportional to said broadcast rate of said pages and said paging terminal further functions to generate page status signals that describe said broadcast rate of said paging signals generated by said paging terminal; and said interface units in said hub are further connected to said paging terminals to receive said page status signals and said interface units in said hub further function to determine said broadcast rate of low-speed digital pages to be broadcast based on the bit durations of the signals and determine the broadcast rate of high-speed digital pages based on said page status signals received by said interface units.

29. The paging system of claim 28, wherein each said interface in said hub places digital signals to be broadcast at different broadcast rates in a single said paging data block by converting the digital signals to be broadcast at one rate to equivalent signals based on the broadcast of the signals at a second broadcast rate and bases said rate signal for said paging data block on said second broadcast rate.

30. A method of distributing paging signals generated by a paging terminal for broadcast by stations distal from the hub, the paging signals having a selected transmission rate, including the steps of:

forwarding the paging signals to a hub;

determining a system time at which each of the paging signals arrives at said hub by reference to a clock at the hub that maintains said system time;

determining the transmission rate of the paging signals generated by the paging terminal;

storing said paging signals in a digital format in a buffer at said hub;

when a selected number of paging signals are stored in said buffer at said hub, placing said selected number of paging signals in a paging data block, and providing said paging data block with a start time, said start time based on said system time of reception of the first paging signal in said paging data block, and a rate signal based on the transmission rate of the paging signals; and forwarding said paging data block to the stations.

31. The method of distributing paging signals of claim 30, wherein selected paging signals are in analog format, further including the steps of:

digitizing and compressing the analog paging signals to produce digitized, compressed analog paging signals having a selected broadcast rate; storing said digitized, compressed analog signals in said buffer in said hub; and setting the transmission rate of said paging data block containing said digitized, compressed analog paging signals equal to said broadcast rate of said digitized, compressed analog paging signals.

32. The method of distributing paging signals of claim 31, wherein selected paging signals are in digital format and consecutive sets of signals generated by the paging terminal are generated at two separate transmission rates, further including the steps of:

converting a first set of paging signals stored in said buffer in said hub into equivalent paging signals having the transmission rate of a second set of paging signals stored in said buffer.

33. The method of distributing paging signals of claim 32, wherein selected paging signals are in analog/format, further including the steps of:

digitizing and compressing the analog paging signals to produce digitized, compressed analog paging signals having a selected broadcast rate: storing said digitized, compressed analog signals in said buffer in said hub; and setting the transmission rate of said paging data block containing said digitized, compressed analog paging signals equal to said broadcast rate of said digitized, compressed analog paging signals.

34. A hub unit for a paging system having a paging terminal from which pages are generated, a number of spaced-apart stations from which pages are broadcast, and a number of link channels over which signals are forwarded to the stations, said hub comprising:

a clock for maintaining a system time;

an interface unit connected to the paging terminal for receiving the pages and connected to said clock for receiving said system time, said interface unit functioning to: determine the rate at which the pages are to be broadcast; packetize the pages into a plurality of paging data blocks wherein the pages in said paging data blocks are in a digital format; and provide each said paging data block with a start time based on said system time and a rate signal based on the rate the pages should be broadcast;

a linking unit connected to the link channels and connected to said interface unit for receiving said paging data blocks from said interface unit and for selectively forwarding said paging data blocks over link channels to the stations;

a central processing unit connected to said interface unit for monitoring the generation of said paging data blocks and connected to said link unit for establishing over which link channel a particular paging data block is forwarded to the stations.

35. The hub unit of claim 34, further including: a plurality of interface units for receiving pages from the paging terminal; a plurality of linking units wherein each of said plurality of linking units is connected to a different one of the link channels; and wherein said central processor unit further functions to control interface unit-to-linking unit paging data block transfer based on which said interface unit generated said paging data block.

36. The hub unit of claim 35, wherein said central processing unit is connected to said plurality of interface units for receiving said paging data blocks therefrom and is connected to said plurality of linking units for sending said signal blocks thereto.

37. The hub of claim 35, wherein said plurality of interface units provide said start times in said paging data blocks based upon said system times the pages are received by the interface units.

38. The hub of claim 37, wherein when the pages are in digital format and wherein said plurality of interface units further function to provide said rate signals in said paging data blocks based on the rate the pages are received by said interface units.

39. The hub of claim 38, wherein selected pages are in analog format and wherein said interface units further function to: digitize and compress the analog pages for placement into said paging data blocks, said digitized, compressed analog pages having a selected broadcast rate; and provide said rate signals for said paging data blocks containing said digitized, compressed analog pages on said selected broadcast rate of said digitized, compressed analog pages.

40. A station for a paging system for broadcasting pages contained in paging data blocks, each said paging data block includes a start time signal and a broadcast rate signal, and wherein the paging data blocks are forwarded over a link channel, said station including:

a transmitter for broadcasting the pages;

a linking unit connected to the link channel for receiving the paging data blocks;

a clock for maintaining a system time; and a station processor that is connected to said station clock for receiving said system time, to said linking unit for receiving said paging data blocks, and to said transmitter for forwarding the signals to be simulcast thereto, said station processor functioning to remove the pages from the paging data blocks and forward the pages to said transmitter for broadcast when said system time equals said start time in the paging data block to be broadcast at a rate based on the broadcast rate in the paging data block.

41. The station of claim 40, wherein redundant copies of the same paging data block are forwarded to the station and wherein said station processor further functions to correct for any errors in said paging data blocks and when said multiple paging data blocks are received, forwards pages from the first received, most error-free redundant paging data block to said transmitter for broadcast.

42. The station of claim 40, wherein said station processor forwards said pages to said transmitter when said system time equals said start time in said paging data block.

43. A paging system for simulcasting pages, comprising:

a paging terminal for receiving calls for system subscribers and functioning to generate corresponding pages; a system controller including;
 (a) a clock for maintaining a system time;
 (b) means for receiving said pages and for receiving said system time, said means packetizing said pages into a plurality of paging data blocks, wherein said paging data blocks are in a digital format, and further functioning to provide each paging data block with a start time based on said system time and a rate signal representing a desired broadcast rate for the pages; and
 (c) a first linking unit for forwarding said paging data blocks over a link channel; and a plurality of paging stations, each paging station including:
 (a) a transmitter for broadcasting said pages;
 (b) a second linking unit for receiving said paging data blocks from the link channel;
 (c) a station clock for maintaining a station time having a predetermined relationship to said system time; and
 (d) a station controller for receiving said station time from said station clock and for receiving said paging data blocks from said second linking unit, and for forwarding said pages to be simulcast to said transmitter, said station controller removing said pages from said paging data blocks and forwarding said pages to said transmitter, once said station time equals said start time in said paging data block to be broadcast, at a rate based on said rate signal in said paging data block.

44. The system of claim 43, wherein said clock includes a receiver for receiving an external absolute time reference, said clock using said external absolute time reference to correlate said station time to said external absolute time.

45. The system of claim 43, wherein said station controller further includes regeneration means for regenerating said pages for broadcast by said transmitter, said pages comprising a plurality of bits, said regeneration means determining a bit broadcast time for each of said plurality of bits, each of said plurality of bits being broadcast by said transmitter when said station time equals said bit broadcast time.

46. A method of simulcasting pages generated by a paging terminal from a plurality of paging stations, each of said paging stations having a transmitter over which the pages are broadcast and a clock, said method comprising the steps of:

packetizing the pages in a plurality of paging data blocks, and providing each of said paging data blocks with a message indicative of a broadcast start time and a rate signal representing a desired broadcast rate for the pages;

transmitting said paging data blocks to the paging stations, wherein each of said paging data blocks is sent to at least two paging stations;

maintaining the clocks at each of said paging stations so that the clocks all indicate a station time having a predetermined relationship to a system time; and upon receipt of one of said paging data blocks at a paging station, removing the pages in said paging data block therefrom, reading said broadcast time, and then forwarding the pages to the transmitter for broadcast when said station time equals said start time in said paging data block.

47. The method of claim 46, further including the steps of:

regenerating said pages for broadcast by said transmitter, said pages comprising of a plurality of bits, by determining a bit broadcast time for each of said plurality of bits; and broadcasting each of said plurality of bits from said transmitter when said station time equals said bit broadcast time and at a rate based on said rate signal in said paging data block.

* * * * *

UNITED STATES PATENT AND TRADEMARK OFFICE
CERTIFICATE OF CORRECTION

PATENT NO. : 5,365,569
DATED : November 15, 1994
INVENTOR(S) : M.L. Witsaman et al.

It is certified that error appears in the above-indentified patent and that said Letters Patent is hereby corrected as shown below:

COLUMN     LINE

On the title page:

| COLUMN | LINE | |
|---|---|---|
| [73] | Assignee (Line 1) | "Glenayre Electronics, Ltd.," should read --Glenayre Electronics, Inc.-- |
| [73] | Assignee (Line 2) | "Vancouver, Canada" should read --Charlotte, North Carolina-- |
| 1 | 61-62 | "signals The" should read --signals. The-- |
| 5 | 9 | "net-work-to-station" should read --network to station-- |
| 6 | 21 | "Hub The" should read --Hub. The-- |
| 6 | 25 | "Link frame The" should read --Link frame. The-- |
| 6 | 30 | "Link channel$_x^"$ A " should read --Link channel$_x$. The-- |
| 6 | 34-35 | "forward" should read --forwarded-- |
| 6 | 42 | "Paging terminal A" should read --Paging terminal. A-- |
| 6 | 51 | "Station A" should read --Station. A-- |
| 6 | 54 | "Station packet A" should read --Station packet. A-- |
| 7 | 9 | "(PSTN)26" should read --(PSTN) 26-- |
| 7 | 31 | "stations/forward" should read --stations forward-- |

UNITED STATES PATENT AND TRADEMARK OFFICE
CERTIFICATE OF CORRECTION

PATENT NO. : 5,365,569
DATED : November 15, 1994
INVENTOR(S) : M.L. Witsaman et al.

It is certified that error appears in the above-indentified patent and that said Letters Patent is hereby corrected as shown below:

| COLUMN | LINE | |
|---|---|---|
| 9 | 23 | "(CUE) 50." should read --(CURE) 50.-- |
| 10 | 33 | "forward s" should read --forwards-- |
| 10 | 59 | "20 There" should read --20. There-- |
| 10 | 60 | "(PTIs)62." should read --(PTIs) 62-- |
| 17 | 58 | "Os" should read --0s-- |
| 20 | 8 | "Os" should read --0s-- |
| 22 | 11 | "field" should read --fields-- |
| 23 | 17 | "channel's" should read --channel$_6$'s-- |
| 23 | 56 | "soilware" should read --software-- |
| 25 | 22 | "CS4216" should read --CS 4216-- |
| 27 | 59 | "frame s 328" should read --frames 328-- |
| 29 | 2 | "fir" should read --for-- |
| 29 | 63-64 | "signals/see." should read --signals/sec.-- |
| 29 | 65 | "the signal at" should read --signal at-- |

UNITED STATES PATENT AND TRADEMARK OFFICE
CERTIFICATE OF CORRECTION

PATENT NO. : 5,365,569  
DATED : November 15, 1994  
INVENTOR(S) : M.L. Witsaman et al.

Page 3 of 4

It is certified that error appears in the above-indentified patent and that said Letters Patent is hereby corrected as shown below:

| COLUMN | LINE | |
|---|---|---|
| 33 | 27 | "$LM_{A, B,}$ or $C$64" should read --$LM_{A, B,}$ or $C$ 64-- |
| 33 | 31 | "soilware" should read --software-- |
| 33 | 35 | "LM(s)64" should read --LM(s) 64-- |
| 36 | 36 | "LM(s)64" should read --LM(s) 64-- |
| 36 | 56 | "steps If" should read --steps. If-- |
| 37 | 13 | "$S.T._N$is" should read --$S.T._N$ is-- |
| 39 | 17 | ,Also," should read --Also,-- |
| 41 (Claim 12, | 54 line 3) | "configure" should read --configured-- |
| 42 (Claim 16, | 25 line 8) | "received" should read --receive-- |
| 44 (Claim 22, | 31 line 40) | "stations packets" should read --station packets-- |
| 44 (Claim 22, | 31 line 45) | "and forward" should read --and to forward-- |

UNITED STATES PATENT AND TRADEMARK OFFICE
CERTIFICATE OF CORRECTION

PATENT NO. : 5,365,569  
DATED : November 15, 1994  
INVENTOR(S) : M.L. Witsaman et al.

Page 4 of 4

It is certified that error appears in the above-indentified patent and that said Letters Patent is hereby corrected as shown below:

| COLUMN | LINE | |
|---|---|---|
| 46 (Claim 22, | 42-43 line 2) | "analog/format" should read --analog format-- |
| 48 (Claim 43, | 11 line 5) | Insert paragraph after "pages;" and "including;" |
| 50 (Claim 47, | 42-43 line 4) | "comprising of a" should read --comprising a-- |

Signed and Sealed this

Sixteenth Day of May, 1995

Attest:

BRUCE LEHMAN

*Attesting Officer*  *Commissioner of Patents and Trademarks*